(12) United States Patent
Tomoyuki et al.

(10) Patent No.: US 11,715,845 B2
(45) Date of Patent: Aug. 1, 2023

(54) ALL SOLID BATTERY

(71) Applicant: SAMSUNG ELECTRONICS CO., LTD., Suwon-si (KR)

(72) Inventors: Shiratsuchi Tomoyuki, Kanagawa-ken (JP); Ryo Omoda, Kanagawa-ken (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 273 days.

(21) Appl. No.: 17/005,677

(22) Filed: Aug. 28, 2020

(65) Prior Publication Data

US 2021/0066758 A1  Mar. 4, 2021

(30) Foreign Application Priority Data

Sep. 2, 2019 (JP) .................................. 2019-159833
Feb. 21, 2020 (KR) ......................... 10-2020-0021770

(51) Int. Cl.
*H01M 10/0585* (2010.01)
*H01M 10/0562* (2010.01)
*H01M 50/531* (2021.01)

(52) U.S. Cl.
CPC ... *H01M 10/0585* (2013.01); *H01M 10/0562* (2013.01); *H01M 50/531* (2021.01); *H01M 2300/0068* (2013.01); *H01M 2300/0094* (2013.01)

(58) Field of Classification Search
CPC ......... H01M 10/0585; H01M 10/0562; H01M 2300/0068; H01M 50/531
See application file for complete search history.

(56) References Cited

U.S. PATENT DOCUMENTS

| | | | |
|---|---|---|---|
| 9,634,358 B2 | 4/2017 | Matsushita | |
| 9,843,071 B2 | 12/2017 | Kato | |
| 9,954,248 B2 | 4/2018 | Ohtomo et al. | |
| 2011/0162198 A1 | 7/2011 | Kawamoto et al. | |
| 2014/0079992 A1* | 3/2014 | Tanaka | H01M 10/0562 429/210 |
| 2014/0082931 A1 | 3/2014 | Nishino et al. | |
| 2016/0268638 A1 | 9/2016 | Jang et al. | |
| 2017/0162862 A1* | 6/2017 | Thielen | H01M 4/136 |
| 2018/0337422 A1* | 11/2018 | Iwamoto | H01M 10/0525 |

(Continued)

FOREIGN PATENT DOCUMENTS

| | | |
|---|---|---|
| JP | 5679748 B2 | 3/2015 |
| JP | 5930035 B2 | 6/2016 |

(Continued)

*Primary Examiner* — Matthew J Merkling
(74) *Attorney, Agent, or Firm* — Cantor Colburn LLP

(57) ABSTRACT

An all solid battery including: a first electrode include a first current collector, and a first active material layer bonded to the first current collector; a first solid electrolyte layer bonded to a surface of the first active material layer opposite the first current collector; a second solid electrolyte layer bonded to a surface of the first solid electrolyte layer opposite the first active material layer; a second electrode including a second current collector, and a second active material layer bonded to the second current collector and a surface of the second solid electrolyte layer opposite the first solid electrolyte layer, wherein the first solid electrolyte layer extends farther than the second current collector in a direction away from a first surface of the all solid battery.

22 Claims, 14 Drawing Sheets

(56) References Cited

U.S. PATENT DOCUMENTS

| | | | |
|---|---|---|---|
| 2018/0342710 A1* | 11/2018 | Yoon | H01M 50/124 |
| 2018/0351159 A1 | 12/2018 | Fujiki et al. | |
| 2019/0131603 A1* | 5/2019 | Park | H01M 10/0525 |
| 2021/0273235 A1* | 9/2021 | Taniuchi | H01M 4/139 |

FOREIGN PATENT DOCUMENTS

| | | |
|---|---|---|
| JP | 2017117672 A | 6/2017 |
| JP | 6181989 B2 | 8/2017 |
| JP | 2018206469 A | 12/2018 |

\* cited by examiner

ALL SOLID BATTERY

CROSS-REFERENCE TO RELATED APPLICATIONS

This application claims priority to and the benefit of Japanese Patent Application No. 2019-159833, filed on Sep. 2, 2019, in the Japanese Patent Office, and Korean Patent Application No. 10-2020-0021770, filed on Feb. 21, 2020, in the Korean Intellectual Property Office, the contents of which in their entirety are herein incorporated by reference.

BACKGROUND

1. Field

The inventive concept relates to an all solid battery.

2. Description of Related Art

To improve the energy density of an all solid lithium-ion secondary battery, increasing the thickness of a cathode layer while decreasing the thickness of a solid electrolyte layer, may be considered.

However, in the case of an all solid battery in which an anode capacity may be determined or dominated by metallic lithium, improving the energy density by increasing the thickness of a cathode layer may increase the amount of metallic lithium precipitated in an anode.

In addition, a solid electrolyte layer having a small thickness may be prone to short-circuiting. Thus there remains a need for improved battery materials.

SUMMARY

In consideration of the above-described problems, an aspect is to provide an all solid battery in which a short circuit does not readily occur.

Additional aspects will be set forth in part in the description which follows and, in part, will be apparent from the description.

An all solid battery according to an embodiment includes a first electrode including a first current collector, and a first active material layer bonded to the first current collector, a first solid electrolyte layer bonded to a surface of the first active material layer opposite the first current collector, a second solid electrolyte layer bonded to a surface of the first solid electrolyte layer opposite the first active material layer, and a second electrode including a second current collector, and a second active material layer bonded to the second current collector and a surface of the second electrolyte layer opposite the first solid electrolyte layer. The first solid electrolyte layer extends farther than the second current collector in a direction away from a first surface of the all solid battery In the all solid battery, the first active material layer may be a cathode active material layer and the second active material layer may be an anode active material layer, or the first active material layer may be an anode active material layer and the second active material layer may be a cathode active material layer.

The insulating layer may include a resin.

According to an embodiment, the anode layer may include at least one of amorphous carbon, gold, platinum, palladium, silicon, silver, aluminum, bismuth, tin, or zinc.

The all solid battery may further include: an other first active material layer bonded to a surface of the first current collector opposite the first active material layer; an other first active material layer bonded to a surface of the other first active material layer opposite the first current collector; an other second solid electrolyte layer bonded to a surface of the other first solid electrolyte layer opposite the other first active material layer; an other second active material layer bonded to a surface of the other second solid electrolyte layer opposite the other first solid electrolyte layer; and an other second active material layer bonded to the second current collector and a surface of the other second solid electrolyte layer opposite the other first solid electrolyte layer, wherein the other first solid electrolyte layer extends farther than the second current collector in a direction away from a first surface of the all solid battery.

A method of manufacturing an all solid battery according to an embodiment includes: preparing a first current collector layer by providing a first current collector, applying a first active material on a surface of the first current collector, drying the first active material on the surface of the first current collector to prepare the first current collector layer; preparing a second current collector layer by providing a second current collector, applying a second active material on a first surface of the second current collector, drying the second active material, applying a solid electrolyte material on a second surface of the second current collector, the second surface of the second current collector being opposite the first surface of the second current collector, and drying the solid electrolyte material to form a solid electrolyte layer and prepare the second current collector layer; disposing a solid electrolyte sheet to contact the first active material and the solid electrolyte material; and bonding the first current collector layer to the solid electrolyte sheet and the second current collector layer to the solid electrolyte sheet to manufacture the all solid battery, wherein a thickness of the solid electrolyte layer in the all solid battery is about 5 micrometers to about 100 micrometers, and a thickness of the solid electrolyte sheet in the all solid battery is about 5 micrometers to about 100 micrometers.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
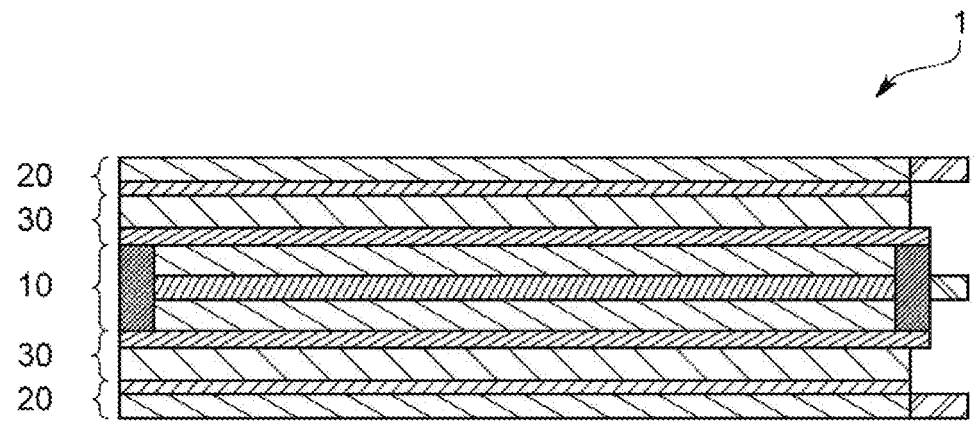
FIG. 1 is a cross-sectional view illustrating a schematic structure of an embodiment of all solid secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an all solid battery according to example embodiments will be described in further detail with reference to the accompanying drawings. Throughout this specification and drawings, the same functional components are denoted by the same reference numeral, and duplicated explanations thereof will not be given. In addition, each element of each drawing is appropriately enlarged or reduced for clarity and convenience of explanation, and the size or proportion of each element may be different from the actual size or proportion of the element. The following example embodiments are essentially provided only by way of examples but are not intended to limit the present inventive concept, and their applications and uses thereof.

The terminology used herein is for the purpose of describing particular example embodiments only and is not intended to be limiting of the present inventive concept. As used herein, the singular forms are intended to include the plural forms as well, unless the context clearly indicates otherwise. The terms "comprises" and/or "comprising," when used in this specification, specify the presence of stated features, integers, steps, operations, elements, parts, components, materials, or combinations thereof, but do not preclude the presence or addition of one or more other features, integers, steps, operations, elements, parts, components, materials, or combinations thereof. The symbol "/" used herein may be interpreted as "and" or "or" according to the context.

In the drawings, the thicknesses of layers and regions are exaggerated or reduced for clarity. Throughout the specification, like reference numerals refer to like elements. Throughout the specification, it is to be understood that when a component, such as a layer, a film, a region, or a plate, is referred to as being "on" another component, the component can be directly on the other component or intervening components may be present thereon. It will be understood that, although the terms "first," "second," etc. may be used herein to describe various elements, components, regions, layers and/or sections, these elements, components, regions, layers and/or sections should not be limited by these terms. These terms are only used to distinguish one element from another element. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

Furthermore, relative terms, such as "lower" and "upper," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

1-1. Structure of all Solid Secondary Battery

A structure of an all solid secondary battery 1 of an embodiment will now be described with reference to FIG. 1. As shown in FIG. 1, the all solid secondary battery 1 includes a cathode layer 10, an anode layer 20, and a solid electrolyte layer 30.

In the all solid secondary battery 1 according to an embodiment, for example, a pair of solid electrolyte layers 30 are arranged on opposite sides of the cathode layer 10 so as to allow the cathode layer 10 to be interposed between the pair of solid electrolyte layers 30, e.g., from the outside, and a pair of anode layers 20, e.g., each being in pair with the cathode layer 10, are additionally arranged so as to allow the solid electrolyte layer 30 to be interposed between the cathode layer 10 and the anode layer 20, e.g., from the outside.

In an embodiment in which at least two solid electrolyte layers are present, e.g., laminated, between a cathode layer and an anode layer of an all solid battery, the solid electrolyte layer may include a scratch or pin hole, which may result in a short circuit. In an embodiment, the scratch or pin hole does not penetrate, e.g., extend through, the at least two solid electrolyte layers, and the likelihood of occurrence of a short circuit from a metal such as lithium that may be precipitated at the anode layer may be decreased or the short circuit may be prevented.

In an embodiment in which layers of the battery are bonded, e.g., laminated, at opposite sides of the first current collector, undesirable curvature of a first current collector may be decreased or prevented when press-molding the all solid battery, and the manufacture of a cell may be facilitated. In an embodiment in which electrodes are disposed only at one side of the first current collector, the curvature of the first current collector may increase, and the manufacture of a cell may become more complicated.

1-1-1. Cathode Layer

Figure 2:
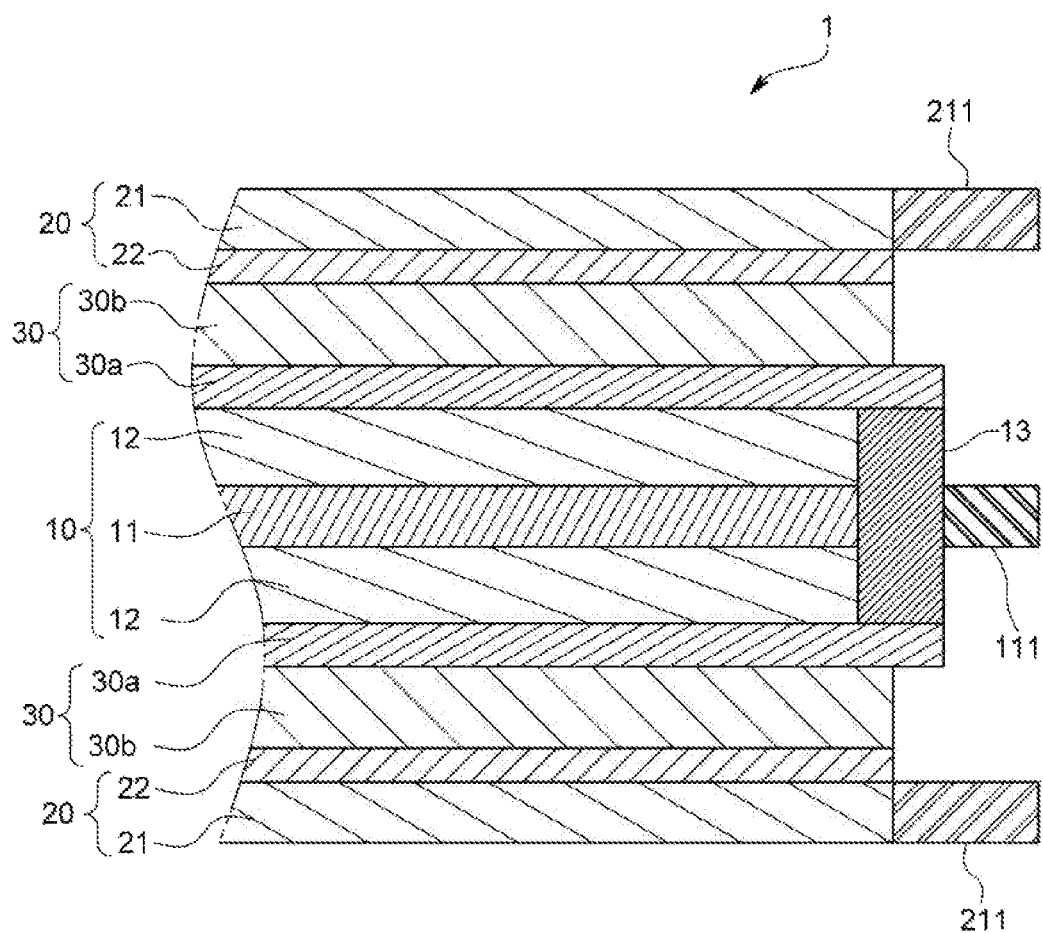
FIG. 2 is an enlarged cross-sectional view of an embodiment illustrating the schematic structure of the all solid secondary battery shown in FIG. 1.

Referring to FIGS. 1 and 2, the cathode layer 10 includes a cathode current collector 11 as a first current collector and a cathode active material layer 12 as a first active material layer.

The cathode current collector 11 may be, for example, a plate-like body or a clad body made of stainless steel, titanium (Ti), nickel (Ni), aluminum (Al), or an alloy thereof.

In addition, when the cathode current collector 11 is used with the all solid secondary battery 1, a cathode current collector portion 111 mounted at an end of the cathode current collector 11 and a terminal (a current collecting tab), although not shown, are provided so as to intervene between the cathode current collector 11 and the wiring, thereby connecting the cathode current collector 11 to the wiring.

The cathode active material layer 12 is located on opposite surfaces of the cathode current collector 11. The cathode active material layer 12 may contain a cathode active material and a solid electrolyte.

The solid electrolyte contained in the cathode active material layer 12 may be the same as or different from the solid electrolyte contained in the solid electrolyte layer 30.

The solid electrolyte will later be described in greater detail with respect to the solid electrolyte layer 30.

The cathode active material may be any suitable cathode active material capable of reversible intercalation and deintercalation of lithium ions.

For example, the cathode active material may be in the form of powder or particulate. Examples of the cathode active material include a lithium cobalt oxide (hereinafter referred to as "LCO"), a lithium nickel oxide, a lithium nickel cobalt oxide, a lithium nickel cobalt aluminum oxide (hereinafter referred to as "NCA"), a lithium nickel cobalt manganese oxide (hereinafter referred to as "NCM"), lithium manganese oxide, lithium iron phosphate, nickel sulfate, copper sulfide, sulfur, iron oxide, or vanadium oxide. Two or more different cathode active materials may be used.

As the cathode active material, at least one composite oxide including, for example, lithium and at least one of cobalt, manganese, or nickel may be used, and specific examples thereof may include at least one compound represented by $Li_aA_{1-b}B'_bD_2$ (wherein $0.90 \leq a \leq 1$ and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; or $LiFePO_4$.

In the foregoing formulas, A is at least one of Ni, Co, or Mn, B' is at least one of Al, Ni, Co, Mn, Cr, Fe, Mg, Sr, V, or a rare earth element; D is at least one of O, F, S, or P; E is at least one of Co or Mn; F' is at least one of F, S, or P; G is at least one of Al, Cr, Mn, Fe, Mg, La, Ce, Sr, or V; Q is at least one of Ti, Mo, or Mn; I' is at least one of Cr, V, Fe, Sc, or Y; and J is at least one of V, Cr, Mn, Co, Ni, or Cu.

In addition, the cathode active material may include a lithium salt of a lithium transition metal oxide having a layered rock-salt type structure. The term "layered" used herein refers to the arrangement of atoms in a crystal structure of the cathode active material, in which atoms may be arranged in layers, as in LCO. In addition, the term "rock-salt structure" used herein refers to a sodium chloride type structure, which is a type of crystal structure. In detail, the rock-salt structure is constructed by dislocating a half of ridges of a unit lattice in a face-centered cubic lattice, wherein a positive ion and a negative ion respectively form cores.

The lithium transition metal oxide having the layered rock-salt structure may be, for example, a ternary lithium transition metal oxide that is represented by $LiNi_xCo_yAl_zO_2$ ("NCA") (wherein $0<x<1$, $0<y<1$, $0<z<1$, and $x+y+z=1$), or $LiNi_xCo_yMn_zO_2$ ("NCM") (wherein $0<x<1$, $0<y<1$, $0<z<1$, and $x+y+z=1$). In addition, the lithium salt of the transition metal oxide having the layered rock-salt structure may have a high content of nickel. For example, the lithium salt may be a lithium salt of a ternary transition metal oxide, which has a high content of nickel, such as $LiNi_aCo_bAl_cO_2$ (wherein $0.5<a<1$, $0<b<0.3$, $0<c<0.3$, and $a+b+c=1$), or $LiNi_aCo_bMn_cO_2$ (wherein $0.5<a<1$, $0<b<0.3$, $0<c<0.3$, and $a+b+c=1$). A combination comprising at least one of the foregoing may be used.

When the cathode active material includes the lithium salt of the ternary transition metal oxide having the layered rock-salt structure, the energy density and thermal stability of the all solid secondary battery 1 may be improved.

Specific examples of the cathode active material may include a compound on the surface of which a coating layer is formed, and a mixture of the compound and a compound having the coating layer. Examples of the coating layer may include a coating element compound such as an oxide or a hydroxide of the coating element, an oxyhydroxide of the coating element, an oxycarbonate of the coating element, and a hydroxy carbonate of the coating element. The compound forming the coating layer may be amorphous or crystalline. Examples of the coating element included in the coating layer may include at least one of Mg, Al, Co, K, Na, Ca, Si, Ti, V, Sn, Ge, Ga, B, As, or Zr. Any suitable coating method may be used as a coating layer forming process. The coating method (e.g., spray coating or dipping) should not adversely affect the physical properties of the cathode active material, for example, due to use of such elements for the compound.

The cathode active material may be coated with, for example, a coating layer. The coating layer of an embodiment may be any suitable coating layer for coating of the cathode active material for the all solid secondary battery 1. The coating layer may comprise, for example, $Li_2O$—$ZrO_2$.

In addition, when the cathode active material includes nickel (Ni) by being formed of a lithium salt of a ternary transition metal oxide, such as NCA or NCM, a capacity density of the all solid secondary battery 1 may increase, and thus metal elution from the cathode active material in a charge state may be reduced. Thus, the all solid secondary battery 1 of an embodiment may have improved long-term reliability and cycle characteristics in a charged state.

Here, a shape of the cathode active material may be, for example, a particle shape such as a true spherical shape or an elliptical spherical shape. In addition, a particle diameter of the cathode active material is not particularly limited but may be in a range applicable to a cathode active material of an all solid secondary battery. In addition, an amount of the cathode active material contained in the cathode layer 10 is not particularly limited but may be in a range applicable to a cathode layer of an all solid secondary battery.

In addition to the cathode active material and the solid electrolyte described herein, additives including, for example, a conducting agent, a binder, a filler, a dispersing agent, or an ion-conducting agent, may be appropriately combined with the cathode active material layer 12.

Examples of the conducting agent that is combinable with the cathode active material layer 12 may include graphite, carbon black, acetylene black, Ketjen black, carbon fibers, or metal powder. In addition, examples of the binder that is combinable with the cathode active material layer 12 may include styrene butadiene rubber ("SBR"), polytetrafluoroethylene, polyvinylidene fluoride, or polyethylene. In addition, as the filler, the dispersing agent, or the ion-conducting agent that are combinable with the cathode active material layer 12, materials for use in an electrode of the all solid secondary battery may be used. In an embodiment, the cathode layer 10 may further include an insulating layer 13 that covers side surface of the cathode layer 10 which is a surface disposed in a different direction from a direction in which the cathode layer 10 is stacked.

The insulating layer 13 may be made of a non-conducting material, and examples thereof may include a resin film including polypropylene or polyethylene, or a resin such as copolymer. Such a resin film may be closely adhered to the cathode layer by press-molding, and thus may not be readily peeled off. In addition, the insulating layer 13 may be a mixture of the resin and an insulating filler. The insulating filler may increase adhesion between component materials thereof the insulating layer 13 by the inclusion of the insulating filler, and thus may have an improved strength during press-molding or use. In addition, by the inclusion of the insulating filler with a resin, the insulating layer 13 is capable of forming fine roughness by mixing the insulating filler on a surface of the insulating layer 13. By the roughness formed on the surface of the insulating layer 13, the solid electrolyte layer may not be readily peeled off from the insulating layer 13 when laminating the first solid electrolyte layer. The insulating filler used may have various shapes such as a particle shape, a fibrous shape, a needle shape or a plate shape. Among others, a fibrous insulating filler may be advantageously used as an insulating filler significantly exhibiting the effects described herein.

From the standpoint of controlling cost, e.g., avoiding a cost increase, the insulating filler may include, for example, at least one of a fibrous resin, a resin-based nonwoven fabric, alumina, magnesium oxide, silica, boehmite, barium titanate, barium carbonate, yttria, or manganese oxide.

In an embodiment in which the all solid battery includes an insulating layer on the first, e.g., side, surface of the first active material layer or the second active material layer, physical contact between the outer edge of the first current collector and the outer edge of the second current collector may be prevented, and a short circuit between the cathode layer and the anode layer may be prevented.

In an all solid battery including an insulating layer on the first, e.g., side, surface of the first solid electrolyte layer or the second solid electrolyte layer, physical contact between the outer edge of the first current collector and the outer edge of the second current collector may be prevented, and a short circuit between the cathode layer and the anode layer may be prevented.

In an embodiment in which the insulating layer additionally includes an insulating filler, the insulating filler may increase adhesion between materials of the insulating layer, and the strength of the insulating layer during press-molding or use may be improved. The surface of the insulating layer may be roughened, e.g., finely roughened, and the solid electrolyte layer may not be readily peeled off from the insulating layer when bonding, e.g., laminating, the first solid electrolyte layer.

In an embodiment in which the insulating layer includes at least one of a fibrous resin, a resin-based nonwoven fabric, alumina, magnesium oxide, silica, boehmite, barium titanate, barium carbonate, yttria, and manganese oxide, an increase in cost may be inhibited or prevented.

1-1-2. Anode Layer

Referring to FIGS. 1 and 2, the anode layer 20 includes an anode current collector 21 as a second current collector, and an anode active material layer 22 as a second active material layer. For example, the anode layer 20 includes the anode current collector 21 shaped of a plate or a foil, and the anode active material layer 22 located on the anode current collector 21 as a second active material layer. In an embodiment, the anode current collector 21 forms an outermost layer of a laminate of the all solid secondary battery 1.

The anode current collector 21 may be made of a material that may not react with lithium, that is, a material that may not form a lithium alloy or a lithium-containing compound.

Examples of a component material of the anode current collector 21 may include copper (Cu), titanium (Ti), iron (Fe), cobalt (Co), and nickel (Ni).

The anode current collector 21 may include copper (Cu), titanium (Ti), iron (Fe), cobalt (Co), or nickel (Ni), or an alloy or clad material of two or more of copper (Cu), titanium (Ti), iron (Fe), cobalt (Co), or nickel (Ni).

The anode active material layer 22 may include, for example, at least one of an anode active material for forming an alloy with lithium ions, or an anode active material for forming a compound with lithium ions. In addition, by the inclusion of such an anode active material in the anode active material layer 22, metallic lithium may precipitate at the surface(s) of one side or both sides of the anode active material layer 22, which will later be described.

The anode active material may be, for example, amorphous carbon, gold (Au), platinum (Pt), palladium (Pd), silicon (Si), silver (Ag), aluminum (Al), bismuth (Bi), tin (Sn), antimony (Sb), and zinc (Zn).

Here, the amorphous carbon may be, for example, carbon black such as acetylene black, furnace black, or Ketjen black, graphene, or the like.

A shape of the anode active material is not particularly limited, and may be, for example, a particle shape, or may be in the form of a uniform layer, for example, a plating layer.

In the former example, the lithium ions may migrate through gaps between the particles of the anode active material and form a metal layer having metallic lithium as a major component between the anode active material layer 22 and the anode current collector 21, while some of the lithium ions exist in the anode active material layer 22 in the form of an alloy with metallic elements present in the anode active material. In the latter example, the metallic lithium in the metal layer may be precipitated between the anode active material layer 22 and the solid electrolyte layer 30.

Specifically, the anode active material layer 22 may include, as the anode active material, a mixture of amorphous carbon having a specific surface area of about 100 square meters per gram (m$^2$/g) or less, for example, about 10 m$^2$/g to about 100 m$^2$/g, about 20 m$^2$/g to about 90 m$^2$/g, about 30 m$^2$/g to about 80 m$^2$/g, or about 40 m$^2$/g to about 70 m$^2$/g, and an amorphous carbon having a large specific surface area of about 300 m$^2$/g or greater, for example, about 300 m$^2$/g to about 500 m$^2$/g, about 310 m$^2$/g to about 475 m$^2$/g, about 320 m$^2$/g to about 450 m$^2$/g, or about 330 m$^2$/g to about 425 m$^2$/g. Specific surface area may be measured by a nitrogen gas adsorption method, e.g., by Brunauer, Emmett and Teller (BET) method using commercially available instrument.

The anode active material layer 22 may include one of such anode active materials or two or more of the anode active materials. For example, the anode active material layer 22 may include only amorphous carbon as the anode active material, or at least one of gold, platinum, palladium, silicon, silver, aluminum, bismuth, tin, antimony, or zinc. In addition, the anode active material layer 22 may include a mixture of amorphous carbon and at least one of gold, platinum, palladium, silicon, silver, aluminum, bismuth, tin, antimony, or zinc. A mixing ratio (mass ratio) of amorphous carbon to the metal(s) described herein, such as gold (Au), may be about 1:1 to about 1:3, and the all solid secondary battery 1 may have further improved characteristics by forming the anode active material using such materials.

When amorphous carbon in combination with at least one of gold, platinum, palladium, silicon, silver, aluminum, bismuth, tin, antimony, or zinc, is used as the anode active material, the anode active material may have a particle diameter of about 4 micrometers (μm) or less, about 3 μm or less, about 2 μm or less, about 1 μm or less, or about 900 nanometers (nm) or less. An average particle diameter of the anode active material may be in a range of, for example, about 10 nm to about 4 μm, about 10 nm to about 3 μm, about 10 nm to about 2 μm, about 10 nm to about 1 μm, or about 10 nm to about 900 nm, and the characteristics of the all solid secondary battery 1 may be further improved. The average particle diameter of the anode active material is, for example, a median diameter (D50) measured by using a laser type particle size distribution meter, e.g., by laser light scattering.

In addition, when a material that is alloyable with lithium, including, for example, at least one of gold, platinum, palladium, silicon, silver, aluminum, bismuth, tin, antimony, or zinc, is used as the anode active material, the anode active material layer 22 may be a layer made of such a metal. For example, the layer made of such a metal may be a plating layer.

The anode active material layer 22 may further include a binder as desired. Examples of the binder may include styrene butadiene rubber ("SBR"), polytetrafluoroethylene ("PET"), polyvinylidene fluoride, and polyethylene oxide. The binder may include only one or two or more of the foregoing binder materials. By the inclusion of the binder in the anode active material layer 22, separation of the anode active material, particularly when the anode active material is in a particle form, may be prevented. A content of the binder included in the anode active material layer 22 may be, for example, about 0.3% by mass or greater and about 20.0% by mass or less, about 1.0% by mass or greater and about 15.0% by mass or less in an embodiment, or about 3.0% by mass or greater and about 15.0% by mass or less in an embodiment, with respect to a total mass of the anode active material layer 22. In an aspect, content of the binder may be about 0.3% by mass to about 15% by mass, or about 1% by mass to about 10% by mass, based on a total mass of the anode active material layer.

In addition, the anode active material layer 22 may be appropriately combined with at least one additive used for all solid secondary batteries, including, for example, a filler, a dispersing agent, an ion-conducting agent, or the like.

When the anode active material is in a particle form, a thickness of the anode active material layer 22 is not particularly limited, and may be, for example, about 1.0 μm or greater and about 20.0 μm or less, or about 1.0 μm or greater and about 10.0 μm or less in an embodiment. When the thickness of the negative active material layer is within these ranges, the effect of the anode active material layer 22 described herein may be attained, and characteristics of the all solid secondary battery 1, may be sufficiently improved by reducing a resistance level of the anode active material layer 22.

When the anode active material is in the form of a uniform layer such as a plating layer, the thickness of the anode active material layer 22 may be, for example, about 1.0 nm or greater and about 100.0 nm or less. The upper limit of the thickness of the anode active material layer 22 may be about 95 nm in an embodiment, about 90 nm in an embodiment, or about 50 nm in an embodiment, and the lower limit of the thickness of the anode active material layer 22 may be about 2.0 nm in an embodiment, about 3.0 nm in an embodiment, or about 4.0 nm in an embodiment.

In addition, in an embodiment, the anode active material layer 22 may employ another structure to be used for the all solid secondary battery 1.

For example, the anode active material layer 22 may be a layer including the anode active material layer 22, an anode active material, a solid electrolyte and an anode layer conducting coagent.

A metal active material or a carbon active material may be used as the anode active material. Examples of the metal active material may include a metal such as lithium (Li), indium (In), aluminum (Al), tin (Sn), or silicon (Si), and alloys thereof. In addition, examples of the carbon active material may include artificial graphite, graphite carbon fiber, resin sintering carbon, pyrolysis vapor grown carbon, coke, mesocarbon microbeads ("MCMB"), furfuryl alcohol resin sintering carbon, polyacene, pitch-based carbon fiber, vapor grown carbon fiber, natural graphite, and non-graphitizable carbon. Two or more different anode active materials may be used.

The anode layer conducting coagent and solid electrolyte may use compounds which are the same as those used in the conducting agent and the solid electrolyte included in the cathode active material layer 12.

1-1-3. Current Collector Portion

Referring to FIGS. 1 and 2, each of the cathode current collector 11 and the anode current collector 21 is connected to an external wiring by providing a current collector portion intervening between each of the cathode current collector 11 and the anode current collector 21 and the external wiring. The current collector portion includes a cathode current collector portion 111 connecting the cathode current collector 11 to the external wiring, and an anode current collector portion 211 connecting the anode current collector 21 to the external wiring.

The cathode current collector portion 111 may be made of, for example, the same material as the cathode current collector 11. The cathode current collector portion 111 may extend from the cathode current collector 11 to then be integrated, or may be separately formed to then be attached to the cathode current collector 11. A separately formed cathode current collector portion 111 may be made of a different material from the cathode current collector 11.

The anode current collector portion 211 may be made of, for example, the same material as the anode current collector 21. The anode current collector portion 211 may extend from the anode current collector 21 to then be integrated, or may be separately formed to then be attached to the anode current collector 21. A separately formed anode current collector portion 211 may be made of a different material from the anode current collector 21.

In more detail, when the cathode current collector 11 is used in the all solid secondary battery 1, it may be connected to the external wiring by allowing the cathode current collector portion 111 mounted at an end of the cathode current collector 11 and a terminal (current collecting tab) (not shown) to intervene between the cathode current collector 11 and the external wiring.

Likewise, when the anode current collector 21 is used in the all solid secondary battery 1, it may be connected to the external wiring by allowing the anode current collector 21 mounted at an end of the anode current collector portion 211 and a terminal (a current collecting tab) (not shown) to intervene between the anode current collector 21 and the external wiring.

In an embodiment in which the all solid battery includes a current collector portion (also referred to herein as a third current collector) connecting the first current collector to an external wiring, wherein the first solid electrolyte layer extends farther than the second current collector in a direction away from a surface, e.g., side surface, of the all solid battery, physical contact between the cathode layer and the anode layer may be prevented if the second current collector is curved when press-molding the all solid battery.

In an embodiment in which the second current collector is curved toward the first current collector by the pressure-molding, the first solid electrolyte layer may extend farther than the second current collector in a direction away from a surface, e.g., side surface, of the all solid battery, the second current collector may be inhibited or prevented from directly contacting the first current collector or the third current collector, and a short circuit between the cathode layer and the anode layer, which may be caused by contact between a cathode current collector portion and the outer edge of the anode current collector, may be prevented.

In an embodiment in which the all solid battery includes a third current collector connecting the first current collector to an external wiring, wherein the first solid electrolyte layer extends farther than the second electrolyte layer in a direction away from a surface, e.g., side surface, of the all solid battery, physical contact between the cathode layer and the anode layer may be prevented if the second current collector is curved when press-molding the all solid battery.

In an embodiment in which the all solid battery includes a third current collector connecting the first current collector to an external wiring, wherein the first solid electrolyte layer extends farther than the first active material layer in a direction away from a surface, e.g., side surface, of the all solid battery, physical contact between the cathode layer and the anode layer may be prevented if the second current collector is curved when press-molding the all solid battery.

In an embodiment in which the all solid battery includes a third current collector connecting the first current collector to an external wiring, wherein the first solid electrolyte layer extends farther than the first active material layer in a direction away from a surface, e.g., side surface, of the all solid battery, or the first solid electrolyte layer extends farther than the second active material layer in a direction away from the surface, e.g., the side surface, of the all solid battery, physical contact between the cathode layer and the anode layer may be prevented if the second current collector is curved when press-molding the all solid battery.

In an embodiment in which the all solid battery includes a first current collector portion connecting the first current collector to an external wiring, and a second current collector portion connecting the second current collector to an external wiring, and a first side surface on which the first current collector portion is located and a second side surface on which the second current collector portion is located are opposite to each other, the first current collector and the second current collector may be located on opposite side surfaces, and physical contact between the cathode layer and the anode layer may be prevented if the second current collector is curved when press-molding the all solid battery.

1-1-4. Solid Electrolyte Layer

Referring to FIGS. 1 and 2, the solid electrolyte layer 30 is a layer located between the cathode layer 10 and the anode layer 20 and including a solid electrolyte.

In an embodiment, two solid electrolyte layers 30 are laminated between the cathode layer 10 and the anode layer 20 being in a pair. In an embodiment, for clarity and convenience of explanation, these solid electrolyte layers 30 will be referred to as a first solid electrolyte layer 30a and a second solid electrolyte layer 30b, respectively, in order according to which one is closer to the cathode layer 10. The order of the "first" or "second" is not particularly limited, and these terms are only used for clarity and convenience of explanation. The first solid electrolyte layer 30a and the second solid electrolyte layer 30b may have the same composition or different compositions. In addition, the first solid electrolyte layer 30a and the second solid electrolyte layer 30b may have the same thickness or different thicknesses compositions.

The thickness of the first solid electrolyte layer 30a or the second solid electrolyte layer 30b may be about 5 μm or greater to about 100 μm or less when a formation of the battery is completed. The thickness of the first solid electrolyte layer 30a or the second solid electrolyte layer 30b may be about 8 μm or greater and about 50 μm or less an embodiment, or about 10 μm or greater and about 30 μm or less in an embodiment.

In an embodiment, although not shown, an insulating layer material for forming an insulating layer is arranged around the first solid electrolyte layer 30a, followed by entirely laminate-packaging the resulting laminate and then pressing (for example, pressing using a hydrostatic pressure), thereby preparing the first solid electrolyte layer 30a. In an embodiment, although not shown, an insulating layer material for forming an insulating layer is arranged around the second solid electrolyte layer 30b, followed by entirely laminate-packaging the resulting laminate and then pressing (e.g., pressing using a hydrostatic pressure), thereby preparing the second solid electrolyte layer 30b. The insulating layer may cover the side surface of the first solid electrolyte layer 30a or the second solid electrolyte layer 30b. The solid electrolyte may be in the form of, for example, powder, and may include, for example, a sulfide-based solid electrolyte material.

Examples of the sulfide-based solid electrolyte material may include $Li_2S$—$P_2S_5$, $Li_2S$—$P_2S_5$—LiX (wherein X is a halogen element, for example, I, Br, or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$-ZmSn (wherein m and are each a positive number, and Z is Ge, Zn and Ga), $Li_2S$—$GeS_2$, $Li_2S$—$SiS_2$—$Li_3PO_4$, and $Li_2S$—$SiS_2$-$Li_pMO_q$ (wherein p and q are each a positive number, and M is P, Si, Ge, B, Al, Ga, or In). Here, the sulfide-based solid electrolyte material may be prepared by treating a starting material (e.g., $Li_2S$ or $P_2S_5$) using a dissolution quenching process or a mechanical milling process. In addition, following such treatment, sintering may be further performed on the resulting sulfide-based solid electrolyte. The solid electrolyte may be amorphous or crystalline, or may be in a mixed state thereof.

In addition, among the sulfide-based solid electrolyte materials described herein, a material containing at least one of sulfur, silicon, phosphorus, or boron, may be used as the solid electrolyte. Accordingly, a lithium conducting property of the solid electrolyte layer 30 may be improved, and characteristics of the all solid secondary battery 1 may also be improved. Specifically, a solid electrolyte including at least sulfur (S), phosphorus (P) and lithium (Li) constituent elements may be used. Specifically, a solid electrolyte including $Li_2S$—$P_2S_5$ may be used.

Here, when the solid electrolyte including $Li_2S$—$P_2S_5$ as the sulfide-based solid electrolyte material is used, a mixing molar ratio of $Li_2S$ and $P_2S_5$, that is, $Li_2S$:$P_2S_5$, may be selected in a range of being 50:50 to 90:10.

The sulfide-based solid electrolyte may include an argyrodite type solid electrolyte represented by Chemical Formula 1:

$$Li_{12-n-x}A1A2_{6-x}A3_x \qquad \text{Chemical Formula 1}$$

wherein in Chemical Formula 1, n is an oxidation state of A, A1 is P, As, Ge, Ga, Sb, Si, Sn, Al, In, Ti, V, Nb or Ta, A2 is S, Se, or Te, A3 is Cl, Br, I, F, CN, OCN, SCN, or $N_3$, and $0 \le x \le 2$.

The argyrodite type solid electrolyte may include, for example, at least one of $Li_{7-x}PS_{6-x}Cl_x$ (wherein $0 \le x \le 2$), $Li_{7-x}PS_{6-x}Br_x$ (wherein $0 \le x \le 2$, or $Li_{7-x}PS_{6-x}I_x$ (wherein $0 \le x \le 2$. Specifically, the argyrodite type solid electrolyte may include at least one of $Li_6PS_5Cl$, $Li_6PS_5Br$, or $Li_6PS_5I$. An elastic modulus, that is, a Young's modulus, of the solid electrolyte may be, for example, about 35 gigapascals (GPa) or less, about 30 GPa or less, about 27 GPa or less, about 25 GPa or less, or about 23 GPa or less. Specifically, the elastic modulus, that is, the Young's modulus, of the solid electrolyte may be, for example, about 10 to about 35 GPa, about 15 to about 35 GPa, about 15 to about 30 GPa, or about 15 to about 25 GPa. Pressing and/or sintering of the solid electrolyte may be more easily performed by having the elastic modulus being in such ranges.

In addition, the solid electrolyte layer 30 may further include a binder. Examples of the binder included in the solid electrolyte layer 30 may include styrene butadiene rubber ("SBR"), polytetrafluoroethylene, polyvinylidene fluoride, polyethylene, and polyacrylic acid. The binder in the solid electrolyte layer 30 may be the same as or different from that in the cathode active material layer 12 or the anode active material layer 22.

In an embodiment in which the cathode layer includes the first current collector, the first active material layer, and the insulating layer, the anode layer includes the second current collector and the second active material layer, and the second current collector is on the insulating layer, the insulating layer may extend farther than the second current collector in a direction away from a surface, e.g., side surface, of the all solid battery, and a short circuit between the cathode layer and the anode layer may be prevented.

In an embodiment in which the cathode layer includes the first current collector, the first active material layer, and the insulating layer, the anode layer includes the second current collector and the second active material layer, and the second anode active material layer is on the insulating layer, the insulating layer may extend farther than the second anode active material layer in a direction away from a surface, e.g., side surface, of the all solid battery, and a short circuit between the cathode layer and the anode layer may be prevented.

In an embodiment in which the cathode layer includes the first current collector, the first active material layer, and the insulating layer, the anode layer includes the second current collector and the second active material layer, the solid electrolyte layer includes the first solid electrolyte layer and the second solid electrolyte layer, and the second solid electrolyte layer is on the insulating layer, the insulating layer may extend farther than the second solid electrolyte layer in a direction away from a surface, e.g., side surface, of the all solid battery, and a short circuit between the cathode layer and the anode layer may be prevented.

In an embodiment in which the solid electrolyte layer includes a sulfide-based solid electrolyte including at least lithium, phosphorus, and sulfur, battery performance may be improved.

1-2. Manufacture of all Solid Secondary Battery

An example method of manufacturing an all solid battery of an embodiment will now be described with reference to the accompanying drawing.

The method of manufacturing the all solid secondary battery 1 of an embodiment will be described as follows with reference to FIGS. 3 to 6.

1-2-1. Preparation of Cathode Layer

Figure 3:
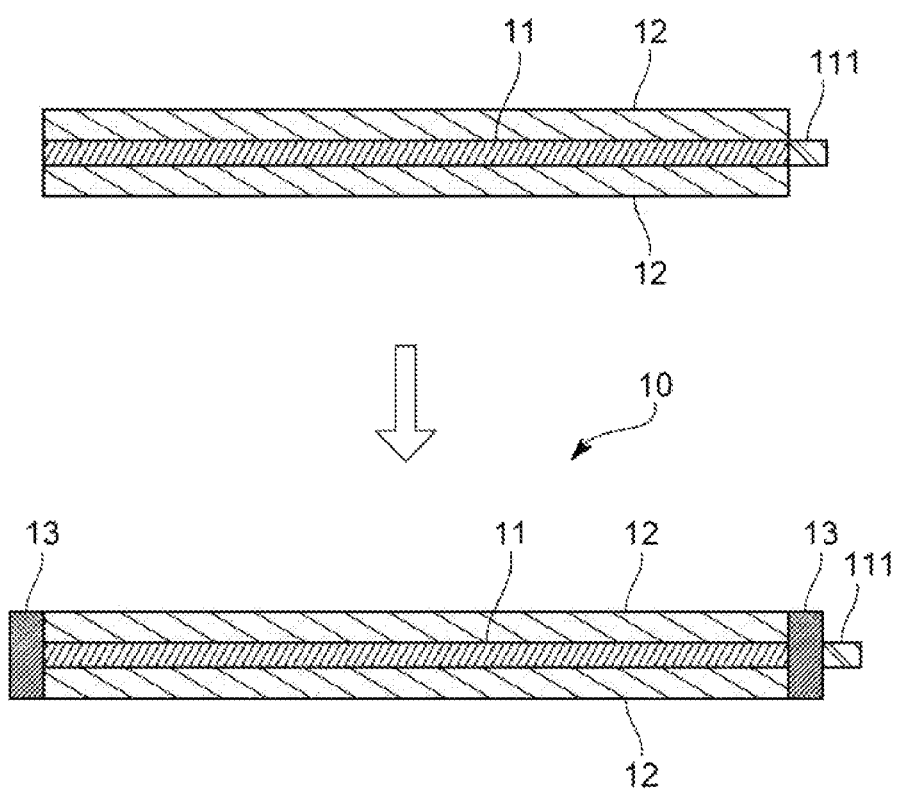
FIG. 3 is a schematic view illustrating an embodiment of a method of manufacturing an all solid secondary battery.

Materials (e.g., a cathode active material, a binder, and the like) constituting the cathode active material layer 12 may be added to a non-polar solvent to prepare a slurry (also referred to as a paste). Next, as shown in FIG. 3, the slurry thus obtained may be applied to opposite surfaces of the cathode current collector 11 shaped of a spherical sheet, and then dried. The resulting laminate may be placed on an aluminum plate, and an insulating layer material for forming an insulating layer 13 is arranged around the laminate, followed by entirely laminate-packaging the resulting laminate and then pressing (for example, pressing using a isostatic pressure), thereby preparing a cathode layer 10 shown in FIG. 3.

1-2-2. Preparation of Anode Layer

Figure 4:
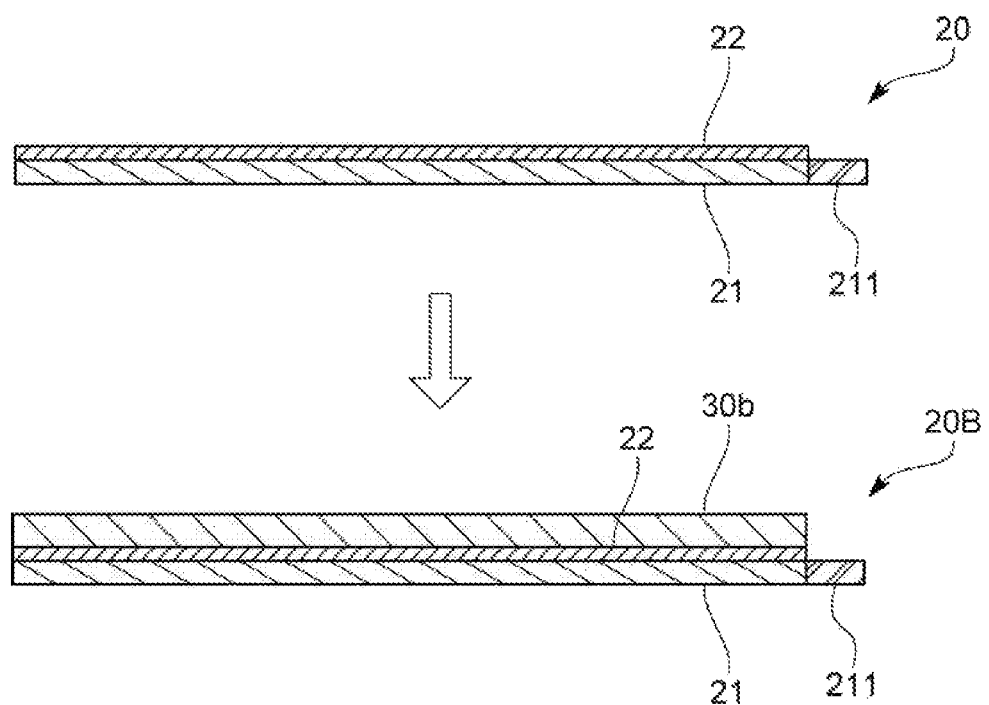
FIG. 4 is a schematic view illustrating an embodiment of a method of manufacturing an all solid secondary battery.

Materials (e.g., a cathode active material, a binder, and the like) constituting the anode active material layer 22 may be added to a non-polar solvent to prepare a slurry. Next, as shown in FIG. 4, the slurry thus obtained may be applied to opposite surfaces of the anode current collector 21 shaped of a spherical sheet, and then dried, thereby preparing an anode layer 20.

1-2-3. Preparation of Solid Electrolyte Layer

The solid electrolyte layer 30 may be prepared using a solid electrolyte prepared from a sulfide-based solid electrolyte material.

In an embodiment, the solid electrolyte layer 30 is formed as a laminate of two layers, and thus one of the two layers is prepared as an independent solid electrolyte sheet and the other is prepared as an electrolytic anode structure 20B laminated on the surface of the anode layer 20.

1-2-4. Preparation of Electrolytic Anode Structure

First, a starting material is treated using a dissolution quenching process or a mechanical milling process.

For example, in a case of using the melt quenching process, the starting materials (for example, $Li_2S$ or $P_2S_5$) may be mixed in predetermined amounts to form pellets, and the obtained pellets may then be reacted under vacuum at a specific reaction temperature, followed by subjecting to quenching, thereby preparing a sulfide-based solid electrolyte material. The reaction temperature for the mixture of $Li_2S$ and $P_2S_5$ may be about 400° C. to about 1000° C., and in an embodiment, about 800° C. to about 900° C. In addition, the reaction time may be about 0.1 hours to about 12 hours, and in some an embodiment, about 1 hour to about 12 hours. In addition, the quenching (rapid cooling) temperature of the reaction product may be about 10° C. or less, and in an embodiment, about 0° C. or less, for example, about −50° C. to about 10° C., about −40° C. to about 0° C., or about −30° C. to about −1° C., and the cooling rate may be about 1° C./second (sec) to about 10,000° C./sec, and in an embodiment, about 1° C./sec to about 1,000° C./sec.

In addition, in a case of using mechanical milling, the starting materials (for example, $Li_2S$, $P_2S_5$, and the like) may be reacted with agitation using a ball mill to prepare the sulfide-based solid electrolyte material. In addition, the agitation speed and the agitation time for the mechanical milling are not specifically limited. The higher the agitation speed, the higher the generation rate of the sulfide-based solid electrolyte material. The longer the agitation time, the higher the conversion rate of the starting materials into the sulfide-based solid electrolyte material.

Then, the mixed materials obtained using the melt quenching process or the mechanical milling process may be thermally treated at a predetermined temperature and then subjected to grinding, to thereby prepare a particulate solid electrolyte. When the solid electrolyte has a glass transition point, the thermal treatment may convert the amorphous solid electrolyte to a crystalline solid electrolyte.

Subsequently, a slurry- or paste-like liquid composition including the solid electrolyte prepared using the method described herein, other additives such as a binder, and dispersion medium, is prepared. The dispersion medium may be a non-polar solvent, such as xylene or diethyl benzene. Concentrations of the solid electrolyte and other additives may be appropriately adjusted according to the composition of the solid electrolyte layer 30 to be formed and the viscosity of the liquid composition.

Next, in a screen printing using the liquid composition including the solid electrolyte, the composition is coated on the entire surface of the anode active material layer 22 and then dried, thereby forming a solid electrolyte layer (second solid electrolyte layer 30b), as shown in FIG. 4. Such a laminate is referred to an electrolytic anode structure 20B. In the screen printing, the mesh number of a screen may be from about 60 to about 300 inclusive, for example, from about 70 to about 275 or from about 80 to about 250. The particle diameter of solid electrolyte used or the viscosity of the liquid composition may help determine the mesh number to be used. When the mesh number is less than about 60, coarse particles, e.g., of solid electrolyte, may not be removed. However, when the mesh number is greater than about 300, the solid electrolyte layer 30 may not be coated in a good condition, e.g., smoothly.

1-2-5. Preparation of Solid Electrolyte Sheet

The liquid composition of the solid electrolyte is coated on a PET film having a release treated surface using a blade and then dried, thereby preparing a solid electrolyte sheet having the first solid electrolyte layer 30a formed on the PET film.

1-2-6. Laminating Process

Figure 5:
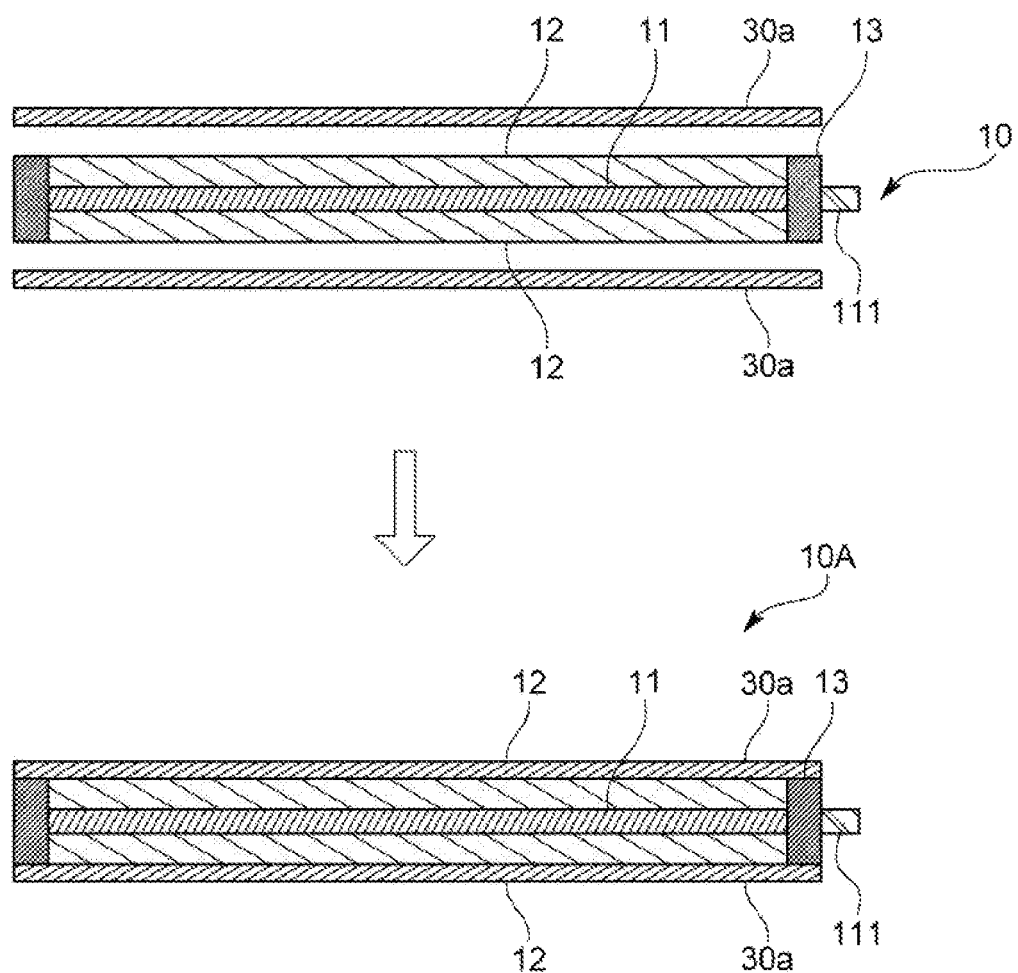
FIG. 5 is a schematic view illustrating an embodiment of a method of manufacturing an all solid secondary battery.

As shown in FIG. 5, a solid electrolyte sheet, which is punched to have the same shape as the cathode layer 10 or punched to be larger than the cathode layer 10, is laminated on opposite surfaces of the thus prepared cathode layer 10, and then pressed. Then, as shown in FIG. 5, the cathode layer 10 and the solid electrolyte layer 30 (that is, the first solid electrolyte layer 30a) are closely adhered to each other, yielding an integrated structure. When the solid electrolyte layer is shaped to be larger than the cathode layer 10, the extra portion of the solid electrolyte layer, which exceeds the cathode layer 10, may be removed. Such a laminate is referred to an electrolytic cathode structure 10A.

Figure 6:
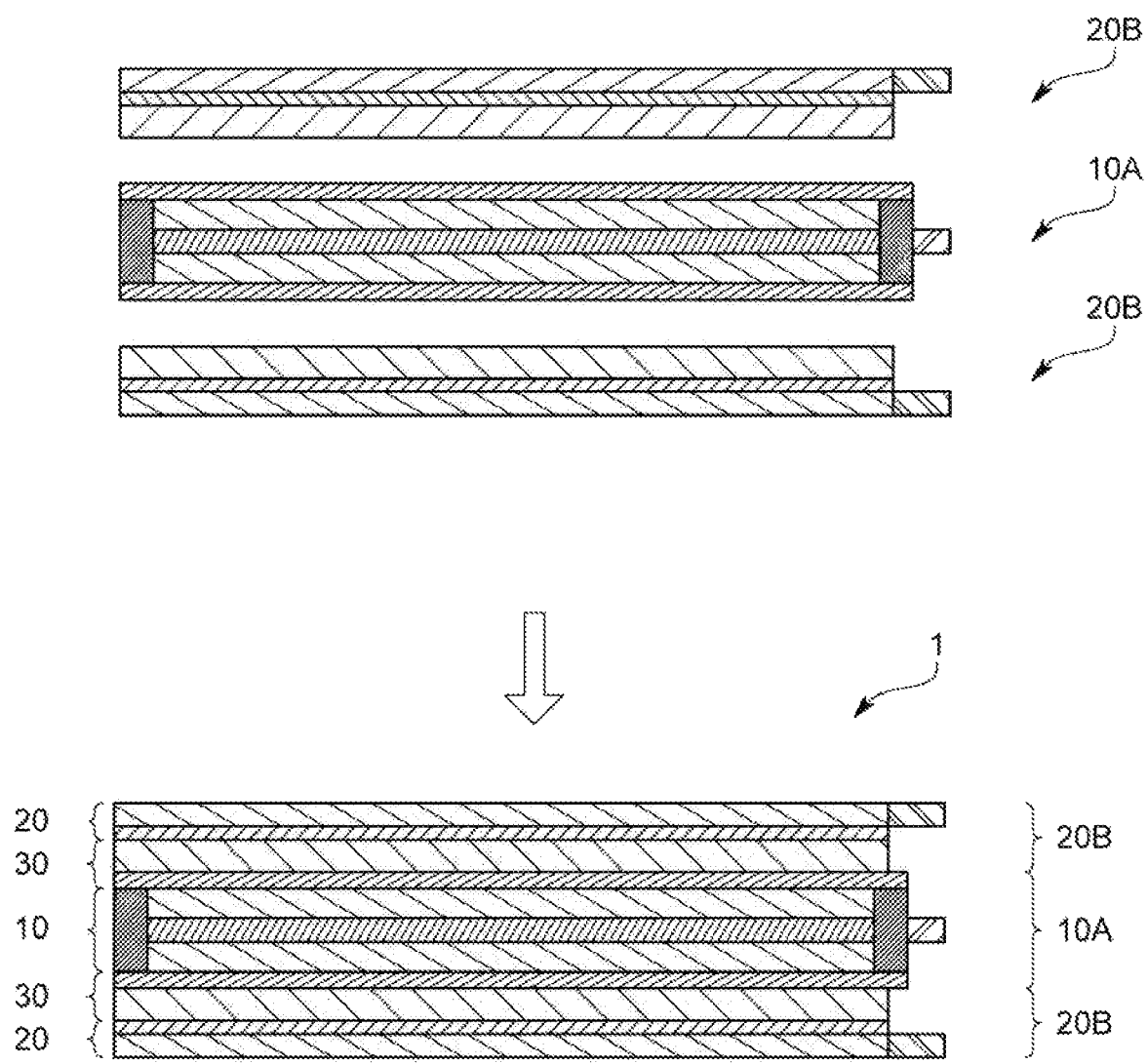
FIG. 6 is a schematic view illustrating an embodiment of a method of manufacturing an all solid secondary battery.

Next, as shown in FIG. 6, the electrolytic anode structure 20B is laminated on opposite surfaces of the electrolytic cathode structure 10A in such a manner that the first solid electrolyte layer 30a of the electrolytic cathode structure 10A and the second solid electrolyte layer 30b of the electrolytic anode structure 20B contact each other, followed by pressing, thereby completing the all solid secondary battery 1 shown in FIG. 6.

Figure 7:
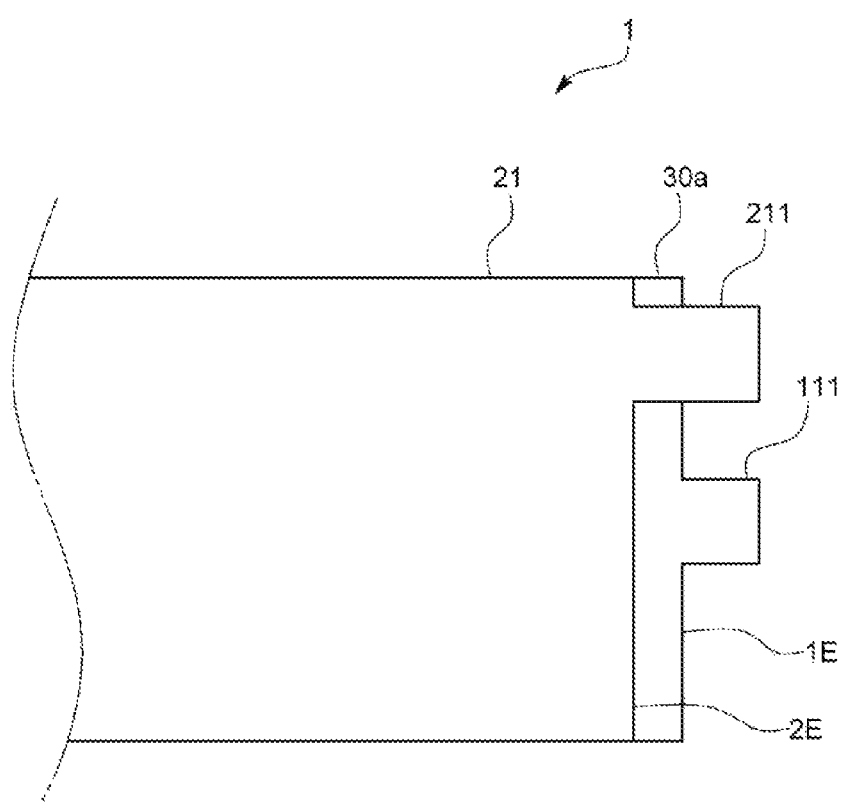
FIG. 7 is an enlarged plan view illustrating a schematic structure of an embodiment of an all solid secondary battery.

Referring to FIGS. 6 and 7, in the laminating process of an embodiment, the all solid secondary battery 1 is formed such that the cathode layer 10 and an outer edge of the first solid electrolyte layer 30a are positioned further outward than the anode layer 20 and an outer edge of the second solid electrolyte layer 30b.

The outer edge of the first solid electrolyte layer 30a may be shifted outward from the anode layer 20 and the outer edge of the second solid electrolyte layer 30b, by as much as, for example, about 1 µm or greater and about 2 millimeters (mm) or less. Such a deviation range may be about 0.05 mm or greater and about 1 mm or less, or about 0.1 mm or greater and about 0.5 mm or less in an embodiment.

More specifically, as shown in FIG. 7, in an embodiment, the outer edge 2E of the anode current collector 21 of the anode layer 20 is arranged further inward than the outer edge 1E of the insulating layer 13 located on the cathode layer 10, and the anode current collector 21 is laminated so as to be positioned on the insulating layer 13.

With this configuration, even if the anode layer 20 is pressed toward the cathode layer 10 and deformed, a physical short circuit between the cathode layer 10 and the outer edge 2E (of the anode current collector 21) of the anode layer 20 may be prevented.

Specifically, since the outer edge 2E (of the anode current collector 21) of the anode layer 20 and the cathode layer 10 may be short-circuited by the cathode current collector portion 111 intervening therebetween, part of the outer edge 1E of the (insulating layer 13 located on the) cathode layer 10 may be arranged further outward than the outer edge 2E (of the anode current collector 21) of the anode layer 20 at an end side where at least the cathode current collector portion 111 is located, as shown in FIG. 7. By having such an arrangement, the cathode current collector portion 111 and the outer edge 2E of the anode current collector 21 are brought into contact with each other, thereby preventing a short circuit between the cathode layer 10 and the anode layer 20. One side of the outer edge 1E of the (insulating layer 13 located on the) cathode layer 10 or the entire circumference may be arranged further outward than the outer edge 2E (of the anode current collector 21) of the anode layer 20.

The outer edge 1E of the (insulating layer 13 located on the) cathode layer 10 refers to a surrounding edge (outer edge) excluding the cathode current collector portion 111 for drawing out the current from the cathode layer 10 to the outside, not in a laminating direction of the cathode layer 10. In an embodiment, the outer edge 1E of the (insulating layer 13 located on the) cathode layer 10 is an outer edge of the insulating layer 13, for example. In addition, the outer edge 2E (of the anode current collector 21) of the anode layer 20 refers to a surrounding edge (outer edge) excluding the anode current collector portion 211 for drawing out the current from the anode layer 20 to the outside, not in a laminating direction of the anode layer 20. In an embodiment, the outer edge 2E (of the anode current collector 21) of the anode layer 20 is an outer edge of the anode active material layer 22, for example.

1-3. Charging and Discharging of all Solid Battery

Charging and discharging of the all solid secondary battery 1 of an embodiment will now be described.

During initial charging of the all solid secondary battery 1 of an embodiment, as the anode active material of the anode active material layer 22, which is capable of forming an alloy or compound with lithium, forms an alloy or compound with lithium ions, the lithium ions may be absorbed into the anode active material layer 22. Then, once a target capacity of the anode active material layer 22 is exceeded, metallic lithium starts to be precipitated on one surface or on each of two opposite surfaces of the anode active material layer 22, and may thus form a lithium metal layer. Since the metallic lithium is formed by diffusion of lithium in the anode active material layer capable of forming an alloy or compound with lithium, it may be uniformly formed as a lithium metal layer, not as a dendritic lithium, along the surface of the anode active material layer 22. During discharge, the metallic lithium of the anode active material layer 22 and the lithium metal layer may be ionized and migrate toward the cathode active material layer 12. Consequently, the metallic lithium per se may be used as an anode active material, and as a result, the energy density of the all solid secondary battery 1 may be improved.

In addition, when the lithium metal layer is formed between the anode active material layer 22 and the anode current collector 21, that is, within the anode layer 20, the anode active material layer 22 covers the lithium metal layer. Accordingly, the anode active material layer 22 may function as a protective layer of the metal layer. Accordingly, a short circuit and a capacity reduction in the all solid secondary battery 1 may be inhibited, and the all solid secondary battery 1 may have improved characteristics.

A method of enabling precipitation of metallic lithium in the anode active material layer 22 may include, for example, a method of allowing the cathode active material layer 12 to have a larger charging capacity than the anode active material layer 22. Specifically, a ratio (capacity ratio) of the charging capacity of the cathode active material layer 12 to the charging capacity of the anode active material layer 22 may be greater than about 0.002:1 and less than about 0.5:1.

When the capacity ratio is about 0.002:1 or less, for example, about 0.00001:1 to about 0.002:1, the anode active material layer 22 may fail to sufficiently mediate the precipitation of metallic lithium from lithium ions depending on the constitution of the anode active material layer 22, and the lithium metal layer may not be properly formed. In addition, if the lithium metal layer is formed between the anode active material layer 22 and the anode current collector 21, the anode active material layer 22 may fail to effectively function as a protective layer. The capacity ratio may be about 0.01:1 or greater, or about 0.03:1 or greater in an embodiment.

In addition, if the capacity ratio is about 0.5:1 or greater, for example, about 0.5:1 to about 0.9:1, the majority of lithium may not be stored in the anode active material layer 22 during charge, or the lithium metal layer may not be uniformly formed depending on the constitution of the anode active material layer 22. For example, the capacity ratio may be about 0.2:1 or less, or about 0.1:1 or less in an embodiment.

The capacity ratio may exceed about 0.01:1. When the capacity ratio is about 0.01:1 or less, the characteristics of the all solid secondary battery 1 may be deteriorated, and the anode active material layer 22 may not effectively function as a protective layer. For example, when the anode active material layer 22 has a very small thickness, the capacity ratio may be about 0.01:1 or less, disintegration of the anode active material layer 22 may occur with repeated charging and discharging, and dendrites may be more likely to precipitate and grow. As a result, characteristics of the all solid secondary battery 1 may be deteriorated. In addition, the capacity ratio may be less than about 0.5:1, for example, less than about 0.25:1. If the capacity ratio is about 0.25:1 or greater, for example, about 0.5:1 or greater, the amount of lithium precipitated in the anode may be reduced, and the battery capacity may be decreased. In addition, the output characteristic of the battery may be further improved by the capacity ratio being less than about 0.25:1.

Here, the charging capacity of the cathode active material layer 12 may be obtained by multiplying the charging capacity density (mAh/g) of the cathode active material by the mass of the cathode active material in the cathode active material layer 12. When multiple cathode active materials are used, the multiplication result value of the charging capacity density and the mass of each of the multiple cathode active materials, and the sum of the multiplication result values may be defined as the charging capacity of the cathode active material layer 12. The charging capacity of the anode active material layer 22 is obtained by the same method as described herein with respect to the cathode active material layer 12. That is, the charging capacity of the anode active material layer 22 may be obtained by multiplying the charging capacity density (mAh/g) of the anode active material by the mass of the anode active material in the anode active material layer 22. When multiple anode active materials are used, the multiplication result value of the charging capacity density and the mass of each of the multiple anode active materials, and the sum of the multiplication result values may be defined as the charging capacity of the anode active material layer 22. Here, the charging capacity densities of the cathode and anode active materials are capacities estimated using all solid half cells using a lithium metal as a counter electrode. In practice, the charging capacities of the cathode active material layer 12 and the anode active material layer 22 may be directly measured with the all solid half cells.

Specifically, the charging capacities may be directly measured in the following manner. First, in order to measure the charging capacity of the cathode active material layer 12, an all solid half-cell using the cathode active material layer 12 as a working electrode and lithium (Li) as a counter electrode, and CC-CV charging is conducted from an open-circuit voltage ("OCV") up to an upper limit charge voltage. The upper limit charge voltage is 4.25 volts (V) for a lithium cobalt oxide-based cathode, as specified in JIS C 8712:2015 standards, and is a voltage obtained by applying section A. 3.2.3 of the JIS C 8712:2015 standards. In order to measure the charging capacity of the anode active material layer 22, an all solid half-cell using the anode active material layer 22 as a working electrode and lithium (Li) as a counter electrode, and CC-CV charging is conducted from an open-circuit voltage ("OCV") up to 0.01 V.

The thus measured charging capacity is divided by the mass of each active material, thereby obtaining the charging capacity density. The charging capacity of the cathode active material layer 12 may be an initial charging capacity measured at the time of first cycle charging.

In an embodiment, the charging capacity of the cathode active material layer 12 is set to be larger than the charging capacity of the anode active material layer 22. As will later be described, in an embodiment, the all solid secondary battery 1 is charged so as to exceed the charging capacity of the anode active material layer 22. That is, the anode active material layer 22 is overcharged. At an initial charging stage, lithium is absorbed into the anode active material layer 22. That is, the anode active material is shifted from the cathode layer 10 to form an alloy or compound with lithium ions. If charging is performed in excess of the capacity of the anode active material layer 22, lithium is precipitated on the back of the anode active material layer 22, that is, between the anode current collector 21 and the anode active material layer 22, and a lithium metal layer is formed by the precipitated lithium.

This phenomenon occurs by forming the anode active material using a particular material, that is, a material that forms an alloy or compound with lithium. During discharge, the metallic lithium of the anode active material layer 22 and lithium metal layer may be ionized to then migrate toward the cathode layer 10. Therefore, in the all solid secondary battery 1, the metallic lithium may be used as the anode active material. More specifically, about 80% or greater of the charging capacity of the anode layer 20 may be exerted, e.g., provided, by the metallic lithium.

In an embodiment in which the anode layer includes at least one of an anode active material that is alloyable with lithium or an anode active material capable of forming a compound with lithium, metallic lithium may be precipitated within the anode layer during charge, and 80% or greater of the capacity of the all solid battery is provided by the metallic lithium, the effects described herein may be more pronounced.

In addition, since the metal layer is covered by the anode active material layer 22 from a side of the solid electrolyte layer 30, the anode active material layer 22 may function as a protective layer of the metal layer, while inhibiting precipitation and growth of dendrites. Accordingly, a short circuit and a capacity reduction in the all solid secondary battery 1 may be efficiently inhibited, and the characteristics of the all solid secondary battery 1 may be improved.

In an embodiment, the first current collector may be an anode current collector and the second active material layer may be an anode active material layer, and the second current collector may be a cathode current collector and the second active material layer may be a cathode active material layer. Two cathode layers 10 each being in a pair with the anode layer 20 may be provided so as to allow the anode layer 20 to be interposed therebetween, and the outer edge of the anode layer 20 may be arranged further outward than the outer edge of the cathode layer 10.

Although the cathode layer 10 including an insulating layer 13 has been described, the anode layer 20 may include an insulating layer. Alternatively, both the cathode layer 10 and the anode layer 20 may include an insulating layer.

The solid electrolyte layer 30, which is provided between the cathode layer 10 and the anode layer 20, may include at least two layers laminated, and three layers or four or more layers may be laminated.

An embodiment may be broadly applied to all solid batteries including the solid electrolyte layer 30 without being limited to the all solid lithium secondary battery.

Hereinafter example embodiments will be described in detail with reference to Examples and Comparative Examples. These examples are provided for illustrative purposes only and are not intended to limit the scope of the present inventive concept.

EXAMPLES

Example 1

Next, examples of the foregoing embodiments will be described. In Example 1, an all solid secondary battery was manufactured by the following process, and the manufactured secondary battery was evaluated.

Preparation of Cathode Layer $LiNi_{0.8}Co_{0.15}Al_{0.05}O_2$ ("NCA") ternary powder as a cathode active material, $Li_2S$—$P_2S_5$ (80:20 mole percent (mol %)) as a sulfide-based solid electrolyte, and vapor-grown carbon fiber powder as amorphous powder and a cathode layer conducting material (conducting coagent) were weighed at a mass ratio (%) of 60:35:5, and then mixed using a planetary mixer.

Next, to the mixed powder was added 5.0% by mass a dehydrated xylene solution having styrene butadiene rubber (SBR) dissolved as a binder, with respect to a total mass of the mixed powder anode active material layer 22, thereby preparing a primary mixed solution.

A secondly mixed solution was prepared by adding to the primary mixed solution an appropriate amount of dehydrated xylene for adjusting the viscosity of the primary mixed solution.

In addition, in order to increase dispersibility of the mixed powder, zirconia balls having a diameter of 5 millimeters (mm) were inserted into the secondary mixed solution such that each of an empty space, the mixed powder, and zirconia balls occupies one-third of the total volume of a kneading vessel.

A tertiary mixed solution was prepared accordingly. The tertiary mixed solution was transferred to the planetary mixer and stirred at a rotational speed of 3,000 revolutions per minute (rpm) for 3 minutes, thereby preparing a cathode active material layer coating solution.

Subsequently, a 20 micrometer (μm) thick aluminum foil current collector was provided as the cathode current collector 11 and was mounted on a desktop screen printing machine. The cathode active material layer coating solution was coated on a sheet using a 150 μm thick metal mask. Next, one surface of the sheet coated with the cathode active material layer coating solution was dried by a 60° C. hot plate for 30 minutes, and the other surface of the sheet was also coated with the cathode active material layer coating solution and then dried by a 60° C. hot plate for 30 minutes, followed by vacuum drying at 80° C. for 12 hours. Accordingly, the cathode active material layer 12 was formed on both surfaces of the cathode current collector 11. After the drying, the total thickness of the cathode current collector 11 and the cathode active material layer 12 was about 330 μm.

An insulating resin film was punched using a Thomson blade to form a ring sized to accurately enclose the cathode active material layer 12 along the periphery of the cathode active material layer 12. The cathode current collector 11 and the cathode active material layer 12 were placed on a 3 mm thick aluminum plate (support member), and the resin film ring was placed around the cathode active material layer 12, followed by vacuum laminate-packaging the resulting product including the support member. Thereafter, the resulting structure was settled down in a pressing medium and then subjected to isostatic pressure treatment (compaction process) under a pressure of 490 megapascals (MPa), thereby integrating the resin film with the cathode current collector 11 and the cathode active material layer 12. The cathode active material layer 12 was laminated on both surfaces of the cathode current collector 11, an insulating layer 13 was further provided to cover another side surface of the cathode active material layer 12 in a different direction from the direction in which the cathode active material layer 12 is laminated, and the resulting structure, including the insulating layer 13, is referred to as a cathode layer 10.

Preparation of Anode Layer

A 10 μm thick nickel foil current collector was prepared as an anode current collector 21. In addition, as anode active materials, CB1 (nitrogen adsorption specific surface area of about 339 square meters per gram ($m^2/g$), DBP oil absorption amount of about 193 ml/100 g) manufactured by ASAHI CARBON CO., LTD., CB2 (nitrogen adsorption specific surface area of about 52 $m^2/g$, DBP supply amount of about 193 milliliters (mL)/100 grams (g)) manufactured by ASAHI CARBON CO., LTD., and silver particles having a particle size of about 3 μm (particle size was measured by the method described herein) were provided.

Subsequently, 1.5 g of CB1, 1.5 g of CB2, and 1 g of silver particles were put into a container, and 4 g of an N-methylpyrrolidone ("NMP") solution including 5 mass % of a binder (#9300, manufactured by KUREHA CORPORATION) was additionally put into the container. Subsequently, the resulting mixed solution was stirred while adding a total amount of 30 g of NMP to the mixed solution little by little, so as to prepare a slurry. The slurry was applied onto a nickel foil current collector using a blade coater, and was dried in the air at 80° C. for 20 minutes, to obtain an anode active material layer 22. A laminate obtained from the anode active material layer 22 was vacuum-dried at 100° C. for 12 hours. Through the processes described herein, the anode layer 20 was prepared.

Preparation of Electrolyte Slurry

An SBR binder dissolved in dehydrated xylene was added to an amorphous powder of $Li_2S$—$P_2S_5$ (mole ratio: 80:20) as a sulfide-based solid electrolyte such that the content of the SBR binder is 1.0 mass % with respect to a total mass of the solid electrolyte, thereby obtaining a primary mixed slurry. In addition, a suitable amount of dehydrated xylene and dehydrated dimethylbenzene for viscosity adjustment were added to the primary mixed slurry to produce a secondary mixed slurry. In addition, in order to increase the dispersability of the mixed powder, zirconia balls having a diameter of 5 mm were added to the secondary mixed slurry such that the volume of occupied by space, mixed powder, and zirconia balls is one-third of the total volume of a kneading container, so as to obtain a tertiary mixed slurry. The tertiary mixed slurry thus obtained was put into a planetary mixer, and stirred at 3,000 rpm for 3 minutes, to prepare an electrolyte layer coating slurry.

Preparation of Solid Electrolyte Sheet

The prepared electrolyte layer coating slurry was coated on a PET film having a release treated surface using a blade coater and then dried by a 40° C. hot plate for 10 minutes, followed by vacuum drying at 40° C. for 12 hours, thereby preparing a solid electrolyte sheet. After the drying, the total thickness of the electrolyte layer was about 15 μm. The dried solid electrolyte sheet was punched using a Thomson knife and processed to have a predetermined size.

Preparation of Electrolytic Cathode Structure

The solid electrolyte sheets were arranged to allow the cathode layer 10 to be interposed therebetween at opposite sides so as to make a first solid electrolyte layer 30a and a cathode active material layer 12 contact each other, and the resulting laminate was placed on a 3 mm thick aluminum plate (support member), followed by vacuum laminate-packaging the resulting product including the support member. Then, the resulting structure was settled down in a pressing medium and then subjected to isostatic pressure treatment (compaction process) under a pressure of 100 MPa, thereby integrating the electrolyte layer placed on the electrolyte sheet with the cathode layer 10. The resulting structure will be referred to as an electrolytic cathode structure 10A.

Preparation of Electrolytic Anode Structure

The anode layer 20 was mounted on a desktop screen printing machine and a solid electrolyte slurry was coated on the anode active material layer 22 of the anode layer 20 using a metal screen mask (ES-100/78 P-500). Next, the metal screen mask coated with the solid electrolyte slurry was dried by a 40° C. hot plate for 10 minutes, followed by vacuum drying at 40° C. for 12 hours, thereby forming a solid electrolyte layer 30b. After the drying, the thickness of the solid electrolyte layer 30b was about 35 μm. The anode coated with the solid electrolyte layer 30b was punched using a Thomson knife and processed to have a predetermined size, and the punched anode was placed on a 3 mm thick aluminum sheet (support member), followed by vacuum laminate-packaging the resulting product including the support member. The resulting structure was settled down in a pressing medium and then subjected to isostatic pressure treatment (compaction process) under a pressure of 100 MPa. The thus obtained structure is referred to as an electrolytic anode structure 20B.

Manufacture of Solid Battery

One unit of the prepared electrolytic cathode structure 10A and two units of the prepared electrolytic anode structures 20B were arranged such that solid electrolyte layers thereof were brought into contact with each other. Here, these structures were arranged such that ends of the electrolytic anode structures 20B were slightly shifted in the opposite direction relative to an end of the electrolytic cathode structure 10A, when viewed from a side of a current collector portion.

Vacuum laminate-packaging was performed on the resulting structure, which was then placed on a 3 mm thick aluminum sheet (support member), followed by vacuum laminate-packaging the resulting product including the support member. The resulting structure was settled down in a pressing medium and then subjected to isostatic pressure treatment (compaction process) under a pressure of 490 MPa. As a result, a unit cell (unit battery) of the all solid secondary battery 1 was manufactured.

Evaluation of Solid Battery

Figure 8:
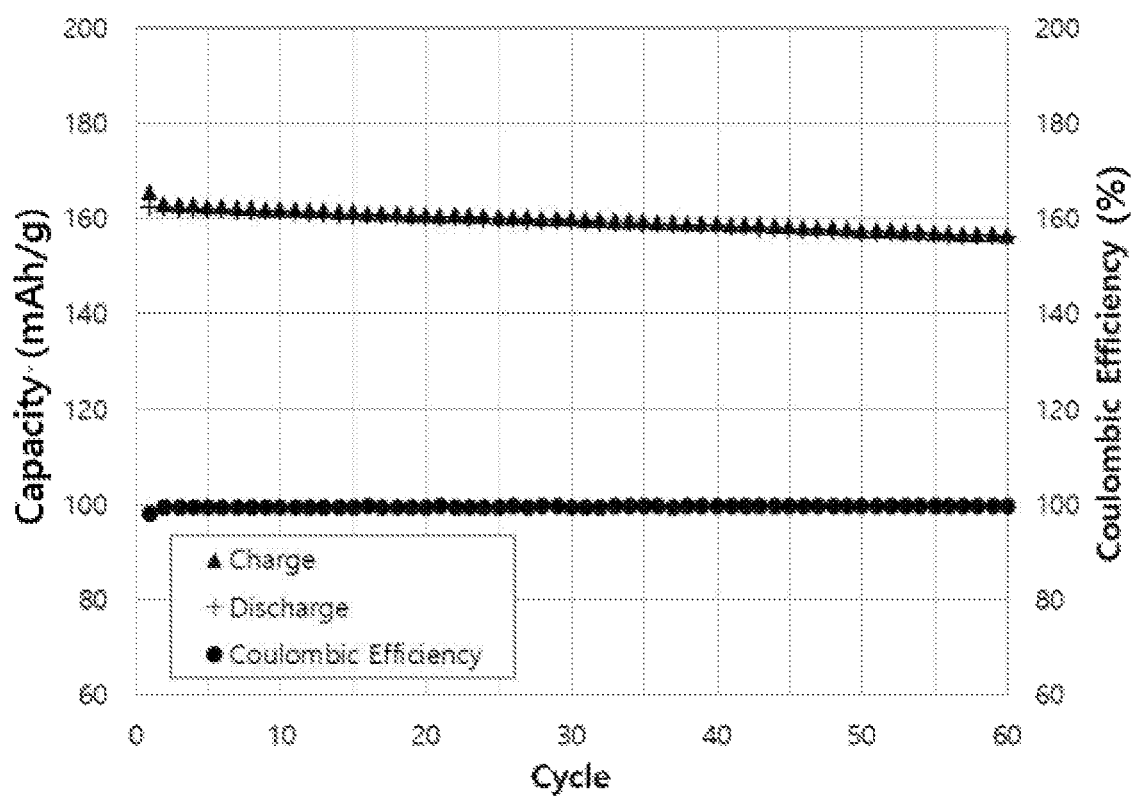
FIG. 8 is a graph of capacity (milliamperes hours per gram (mAh/g)) and coulombic efficiency (percent (%)) versus number of cycles illustrating cycle characteristics of the all solid secondary battery of Example 1.

A unit cell of an all solid battery manufactured in the order stated herein was held between two sheets of upper and lower metal plates, and the metal plates were tightened by inserting screws with springs into holes formed in the metal plates such that the pressure applied to the battery was 3.0 MPa. Battery characteristics were evaluated through cycling tests using a charge-discharge tester (TOSCAT-3100) such that charging was carried out to a maximum voltage of 4.2 V at a constant current of 0.5 C at 60° C., constant voltage charging was then carried out until a current value of 0.1 C was reached, and discharging was carried out at 0.5 C to a discharging end voltage of 2.5 V. The evaluation results are shown in FIG. 8.

Example 2

Figure 9:
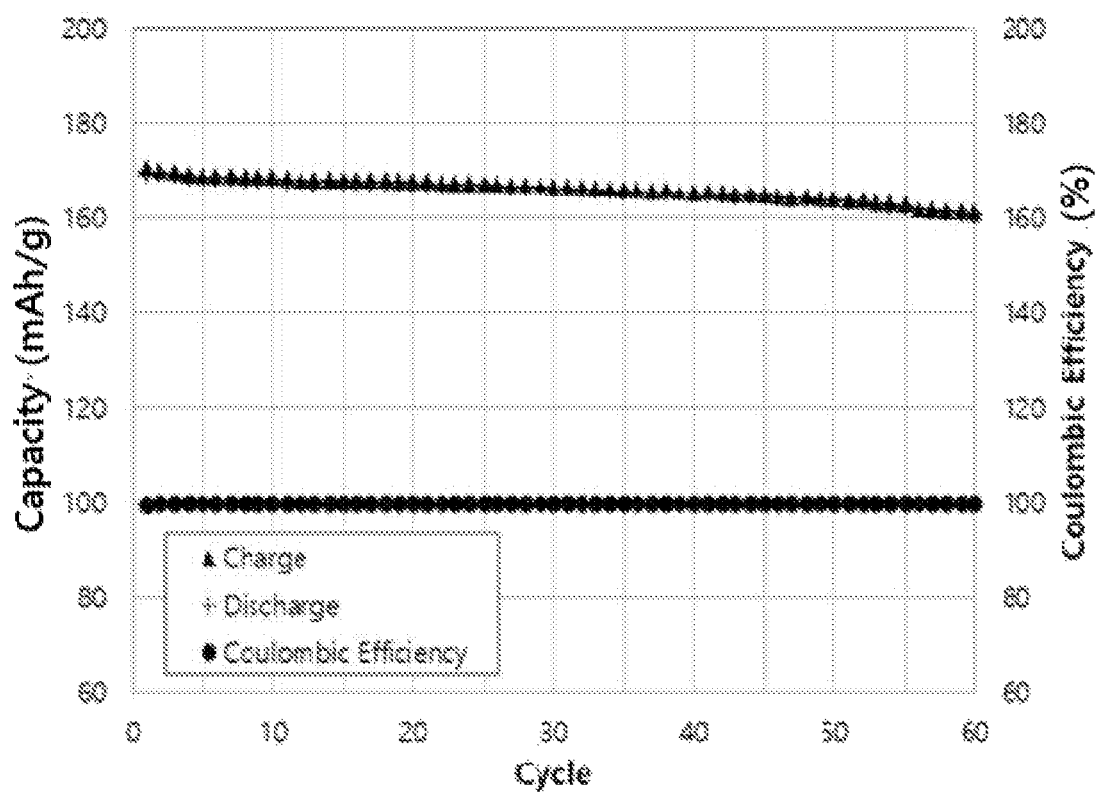
FIG. 9 is a graph of capacity (mAh/g) and coulombic efficiency (%) versus number of cycles illustrating cycle characteristics of the all solid secondary battery of Example 2.

A unit cell of an all solid battery was manufactured in the same order as in Example 1, except that hydrostatic pressure treatment (transcription process) for integrating the electrolyte sheet with the cathode layer 10 was performed under the pressure of 20 MPa, and battery characteristics were evaluated under the same charging and discharging conditions as in Example 1. The evaluation results are shown in FIG. 9.

Comparative Example 1

Figure 10:
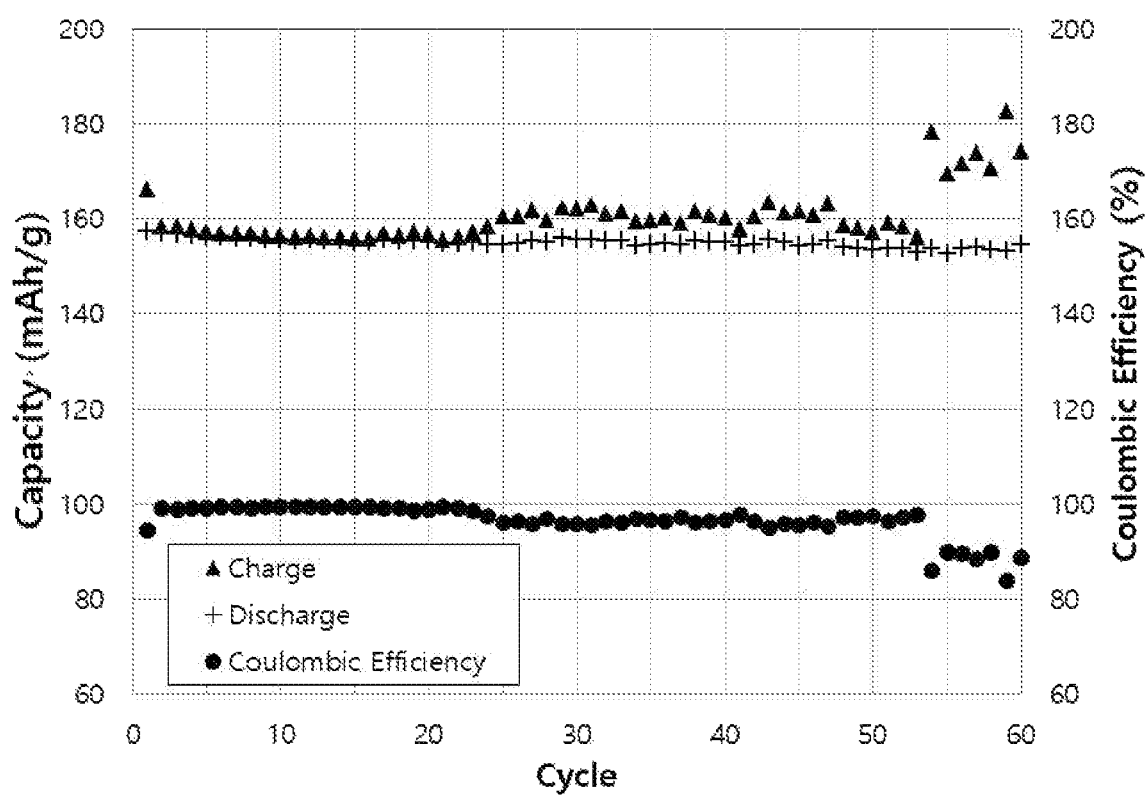
FIG. 10 is a graph of capacity (mAh/g) and coulombic efficiency (%) versus number of cycles illustrating cycle characteristics of an all solid secondary battery according to Comparative Example 1.

An electrolyte layer having a thickness of about 50 μm was used in an electrolytic anode structure 20B, and a cathode layer 10 without an electrolyte sheet integrated therewith was used, instead of the electrolytic cathode structure 10A. Except for the foregoing, a unit cell of an all solid battery was manufactured in the same order as in Example 1, and battery characteristics were evaluated under the same charging and discharging conditions as in Example 1. The evaluation results are shown in FIG. 10.

Comparative Example 2

Figure 11:
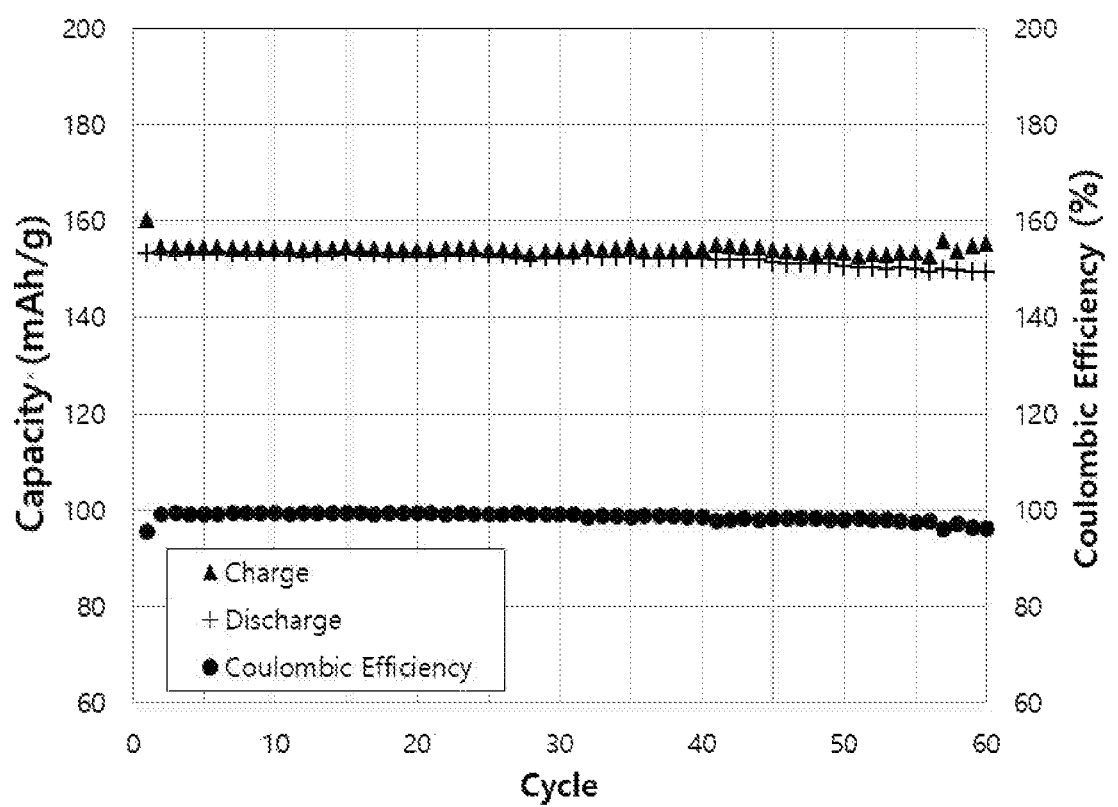
FIG. 11 is a graph of capacity (mAh/g) and coulombic efficiency (%) versus number of cycles illustrating cycle characteristics of an all solid secondary battery according to Comparative Example 2.

An electrolyte layer having a thickness of about 50 μm was used in an electrolytic anode structure 20B (under the pressure of 50 MPa for transcription), and an anode layer 20 that is not coated with a second solid electrolyte layer 30b was used, instead of the electrolytic anode structure 20B. Except for the foregoing, a unit cell of an all solid battery was manufactured in the same order as in Example 1, and battery characteristics were evaluated under the same charging and discharging conditions as in Example 1. The evaluation results are shown in FIG. 11.

Comparative Example 3

Figure 12:
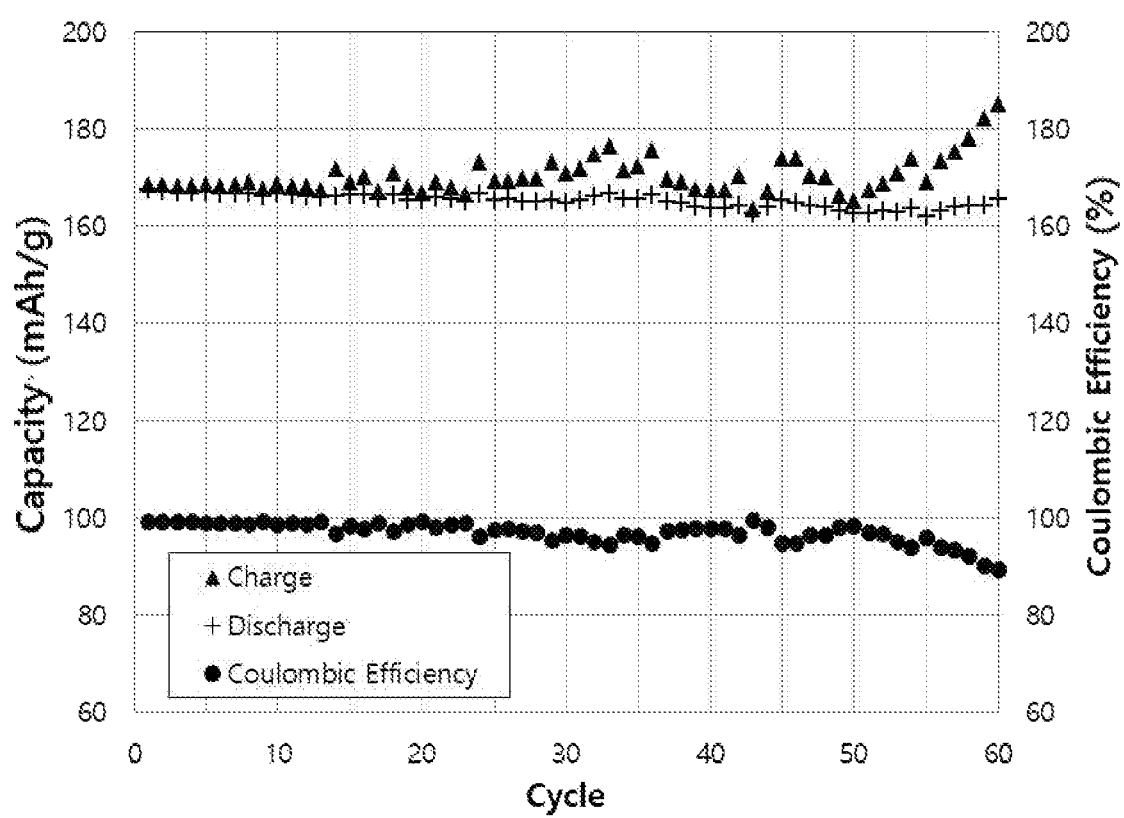
FIG. 12 is a graph of capacity (mAh/g) and coulombic efficiency (%) versus number of cycles illustrating cycle characteristics of an all solid secondary battery according to Comparative Example 3.

An anode layer 20 and a cathode layer 10 were used, instead of the electrolytic anode structure 20B and the electrolytic cathode structure 10A used in Example 1. Additionally, an about 80 μm thick free-standing solid electrolyte sheet was used as an electrolyte layer, the sheet obtained by coating a solid electrolyte slurry on a nonwoven fabric, drying and then punching using a Thomson blade. The free-standing solid electrolyte sheet was additionally held between the anode layer 20 and the cathode layer 10 and then subjected to hydrostatic pressure treatment (compaction process) under the pressure of 490 MPa. A unit cell (unit battery) of the all solid secondary battery 1 was manufactured by the method stated herein, and battery characteristics were evaluated under the same charging and discharging conditions as in Example 1. The evaluation results are shown in FIG. 12.

Comparative Example 4

Figure 13:
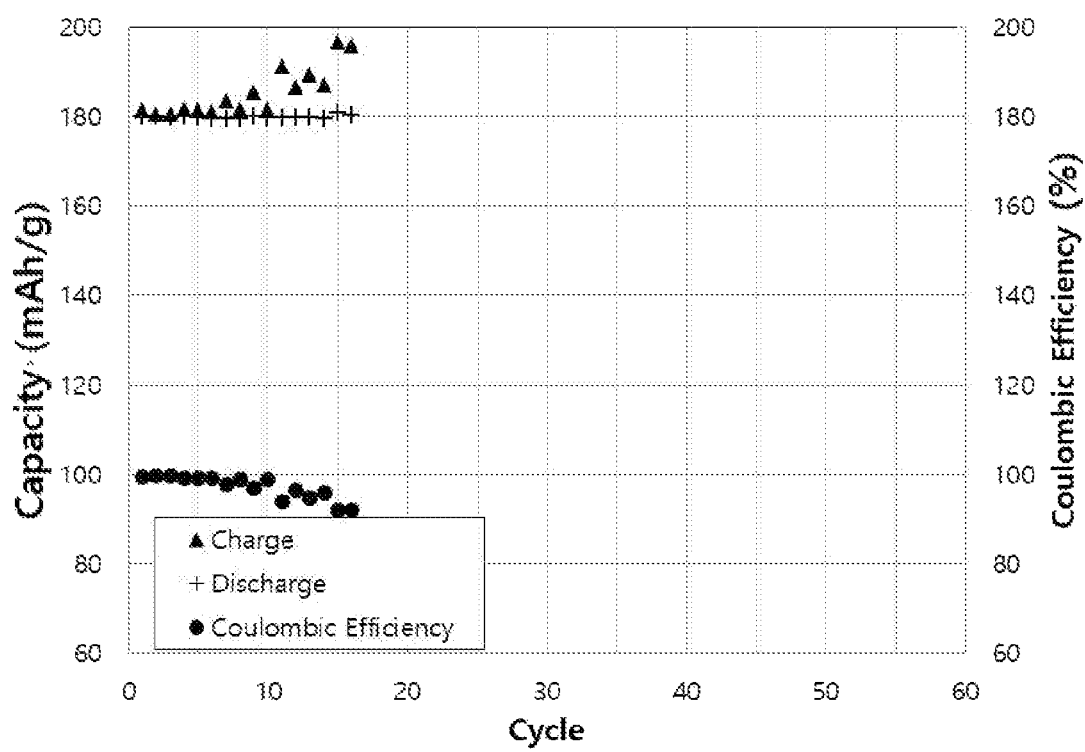
FIG. 13 is a graph of capacity (mAh/g) and coulombic efficiency (%) versus number of cycles illustrating cycle characteristics of an all solid secondary battery according to Comparative Example 4.

A unit cell of an all solid secondary battery was manufactured by performing isostatic pressure treatment (transcription process) for integrating an electrolyte sheet with the cathode layer 10 under the pressure of 20 MPa in preparing the electrolytic cathode structure 10A, like in Comparative Example 2, and battery characteristics were evaluated under the same charging and discharging conditions as in Example 1. The evaluation results are shown in FIG. 13.

Comparative Example 5

Figure 14:
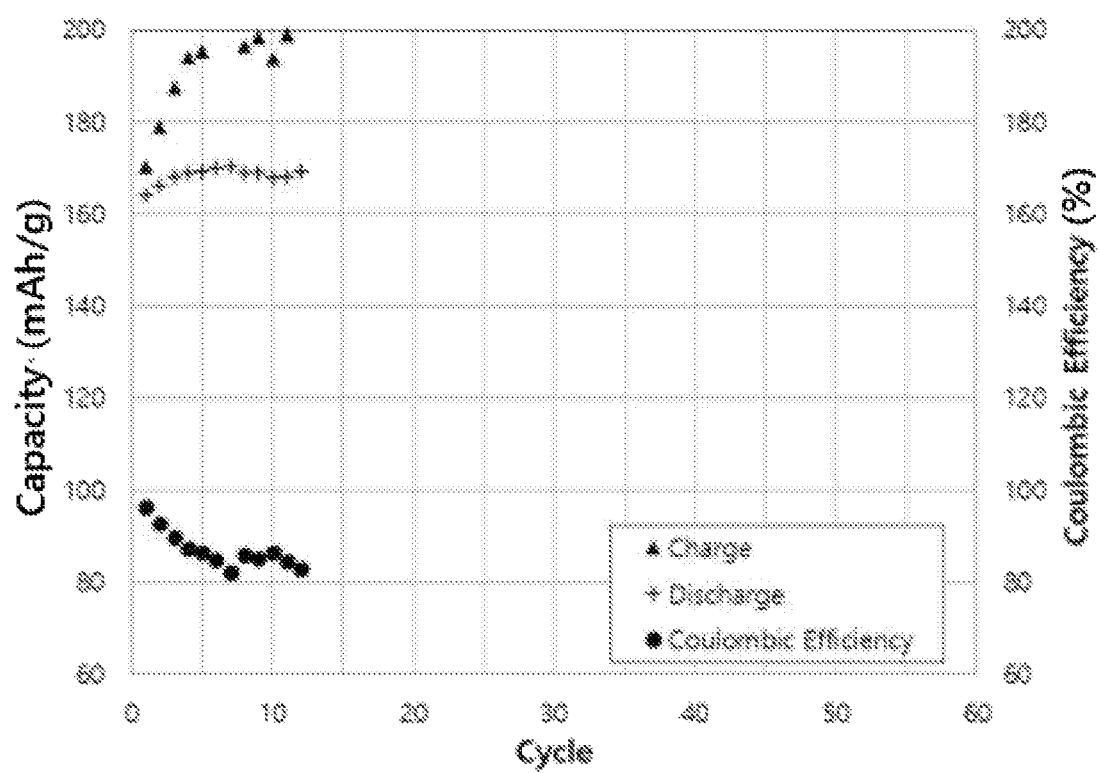
FIG. 14 is a graph of capacity (mAh/g) and coulombic efficiency (%) versus number of cycles illustrating cycle characteristics of an all solid secondary battery according to Comparative Example 5.

A unit cell of an all solid secondary battery was manufactured in the same manner as in Example 1, except that in preparing a cathode layer 10 and an electrolytic cathode structure 10A, a cathode active material layer and a first solid electrolyte layer were laminated only one surface of a cathode current collector, and one electrolytic anode structure was laminated on the electrolytic cathode structure 10A, and battery characteristics were evaluated under the same charging and discharging conditions as in Example 1. The evaluation results are shown in FIG. 14.

In FIGS. 8 to 14, coulombic efficiencies, as indicated by black circles, deviating from 100%, except for the first cycle, suggest that short circuits occurred to unit cells. For each of the unit cells manufactured in Examples and Comparative Examples, occurrence of a short circuit occurred thereto when the coulombic efficiency was less than 99%.

As a result, in Examples 1 and 2 in which two solid electrolyte layers 30 were laminated between the cathode layer 10 and the anode layer 20, a short circuit did not occurred even after the 60th cycle.

However, in Comparative Examples 1 to 4 in which only one solid electrolyte layer 30 was laminated between the cathode layer 10 and the anode layer 20, short circuits all occurred in fewer than 60 cycles. Specifically, in Comparative Example 1, a short circuit occurred at the 23rd cycle. In Comparative Example 2, a short circuit occurred at the 32nd cycle. Comparative Example 3, a short circuit occurred at the 7th cycle. Comparative Example 4, a short circuit occurred at the 7th cycle.

From these results, it was confirmed that a short circuit between the cathode layer 10 and the anode layer 20 was not likely to occur when two or more solid electrolyte layers 30 are laminated therebetween, compared when only one solid electrolyte layers 30 is laminated therebetween.

In addition, in Comparative Example 3, even if the solid electrolyte layer 30 had a thickness of about 80 μm, which is relatively thick, a short circuit occurred earlier than in Examples 1 and 2 in which the total thickness of the laminated solid electrolyte layers 30 was 50 μm. From these results, it was confirmed that laminating two or more solid electrolyte layers may be an important factor in inhibiting a short circuit, rather than increasing the thickness of the solid electrolyte layer.

In addition, as shown in FIG. 14, when a first active material layer, a first solid electrolyte layer and an electrolytic anode structure were laminated on only one surface of a first current collector, a short circuit immediately occurred. When the cathode active material layer, the solid electrolyte layer and the electrolytic anode structure were formed only on surface of a cathode current collector as the first current collector and then press-molded with an isostatic pressure, the pressure is applied to only one surface of the cathode current collector. Thus, when a laminate packaging was uncovered, the first current collector or a second current collector is curved. As a result, the high likelihood of short circuits occurring between the first current collector and the second current collector may be considered as one of causes of immediate short-circuiting of the battery.

Meanwhile, in Examples 1 and 2, the first active material layer, the first solid electrolyte layer and the electrolytic anode structure are laminated, e.g., equivalently laminated, on both surface of the first current collector, and thus the curvature of the cathode current collector and the second current collector can be prevented. As a result, a short circuit between the first current collector and the second current collector may be suppressed.

According to an aspect, since at least two layers of the solid electrolyte layer are stacked, a short circuit may be effectively suppressed.

Accordingly, a short circuit may not readily occur in an all solid battery with an increased thickness of the cathode layer, decreased thickness of the solid electrolyte layer, and increased energy density.

In addition, since various layers constituting the battery are laminated, equivalently laminated, at opposite sides of the first current collector, undesirable curvature of the first current collector can be inhibited when press-molding the all solid battery.

As a result, a short circuit, for example, occurring due to contact between the cathode layer and the anode layer, may also be prevented.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An all solid battery comprising:
   a first electrode comprising
      a first current collector, and
      a first active material layer bonded to the first current collector;
   a first solid electrolyte layer bonded to a surface of the first active material layer opposite the first current collector;
   a second solid electrolyte layer bonded to a surface of the first solid electrolyte layer opposite the first active material layer; and
   a second electrode comprising
      a second current collector, and
      a second active material layer bonded to the second current collector and a surface of the second solid electrolyte layer opposite the first solid electrolyte layer,
   wherein the first solid electrolyte layer extends farther than the second current collector in a direction away from a first surface of the all solid battery, and
   wherein the second electrode extends farther than the first electrode in a direction away from a first surface of the first active material layer.

2. The all solid battery of claim 1, wherein
   the first active material layer is a cathode active material layer and the second active material layer is an anode active material layer, or
   the first active material layer is an anode active material layer and the second active material layer is a cathode active material layer.

3. The all solid battery of claim 1, wherein the first solid electrolyte layer extends farther than the second solid electrolyte layer in the direction away from the first surface of the all solid battery.

4. The all solid battery of claim 1, wherein the first solid electrolyte layer extends farther than the first active material layer in the direction away from the first surface of the all solid battery.

5. The all solid battery of claim 4, wherein the second active material layer extends farther than the first active material layer in the direction away from the first surface of the all solid battery.

6. An all solid battery comprising:
   a first electrode (10) comprising
      a first current collector (11), and
      a first active material layer (12) bonded to the first current collector (11);
   a first solid electrolyte layer (30a) bonded to a surface of the first active material layer (12) opposite the first current collector (11);
   a second solid electrolyte layer (30b) bonded to a surface of the first solid electrolyte layer (30a) opposite the first active material layer (12);
   a second electrode (20) comprising
      a second current collector (21), and
      a second active material layer (22) bonded to the second current collector (21) and a surface of the second solid electrolyte layer (30b) opposite the first solid electrolyte layer (30a);
   a third current collector (111) connecting the first current collector (11) to an external wiring; and
   a fourth current collector (211) connecting the second current collector (21) to an external wiring, wherein the first solid electrolyte layer (30*a*) extends farther than the second current collector (21) in a direction away from a first surface of the first active material layer,
wherein the third current collector (111) is disposed on the first surface of the all solid battery,
the fourth current collector (211) is disposed on a second surface of the all solid battery, and
the second surface of the all solid battery is opposite the first surface of the all solid battery.

7. The all solid battery of claim 1, further comprising an insulating layer on a surface of at least one of the first active material layer or the second active material layer.

8. The all solid battery of claim 1, further comprising an insulating layer on a surface of at least one of the first solid electrolyte layer or the second solid electrolyte layer.

9. The all solid battery of claim 8, wherein the insulating layer comprises a resin.

10. The all solid battery of claim 8, wherein the insulating layer comprises an insulating filler.

11. The all solid battery of claim 10, wherein the insulating filler comprises at least one of a fibrous resin, a resin nonwoven fabric, alumina, magnesium oxide, silica, boehmite, barium titanate, barium carbonate, yttria, or manganese oxide.

12. The all solid battery of claim 1, wherein
the all solid battery comprises
a cathode layer, and
an anode layer,
the cathode layer comprises the first current collector, the first active material layer, and an insulating layer,
the anode layer comprises the second current collector and the second active material layer, and
the second current collector is on the insulating layer.

13. The all solid battery of claim 1, wherein
the all solid battery comprises
a cathode layer, and
an anode layer,
the cathode layer comprises the first current collector, the first active material layer, and an insulating layer,
the anode layer comprises the second current collector and the second active material layer, and
the second active material layer is on the insulating layer.

14. The all solid battery of claim 1, wherein
the all solid battery comprises
a cathode layer,
an anode layer, and
a solid electrolyte layer,
the cathode layer comprises the first current collector, the first active material layer, and an insulating layer,
the anode layer comprises the second current collector and the second active material layer,
the solid electrolyte layer comprises the first solid electrolyte layer and the second solid electrolyte layer, and
the second solid electrolyte layer is on the insulating layer.

15. The all solid battery of claim 1, wherein at least one of the first solid electrolyte layer or the second solid electrolyte layer comprises a sulfide solid electrolyte comprising lithium, phosphorus, and sulfur.

16. The all solid battery of claim 1, wherein at least one of the first solid electrolyte layer or the second solid electrolyte layer comprises at least one sulfide solid electrolyte, and wherein the sulfide solid electrolyte comprises $Li_2S$—$P_2S_5$, $Li_2S$—$P_2S_5$—LiX wherein X is I, Br, or Cl, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$-ZmSn wherein m and are each a positive number, and Z is Ge, Zn and Ga, $Li_2S$—$GeS_2$, $Li_2S$—$SiS_2$—$Li_3PO_4$, and $Li_2S$—$SiS_2$-$Li_pMO_q$ wherein p and q are each a positive number, and M is P, Si, Ge, B, Al, Ga, or In.

17. The all solid battery of claim 1, wherein at least one of the first solid electrolyte layer or the second solid electrolyte layer comprises an argyrodite solid electrolyte represented by Chemical Formula 1:

$$Li_{12-n-x}A1A2_{6-x}A3_x \qquad \text{Chemical Formula 1}$$

wherein in Chemical Formula 1,
n is an oxidation state of A,
A1 is P, As, Ge, Ga, Sb, Si, Sn, Al, In, Ti, V, Nb or Ta,
A2 is S, Se, or Te, A3 is Cl, Br, I, F, CN, OCN, SCN, or $N_3$, and

18. The all solid battery of claim 1, wherein at least one of the first solid electrolyte layer or the second solid electrolyte layer comprises at least one of $Li_{7-x}PS_{6-x}Cl_x$, $Li_{7-x}PS_{6-x}Br_x$, or $Li_{7-x}PS_{6-x}I_x$, wherein $0 \leq x \leq 2$.

19. The all solid battery of claim 1, wherein
the all solid battery comprises an anode layer,
the anode layer comprises at least one of an anode active material that is alloyable with lithium or an anode active material capable of forming a compound with lithium,
the all solid battery is configured to precipitate lithium metal within the anode layer during charge, and
about 80% to about 100% of the capacity of the all solid battery is provided by the lithium metal precipitated within the anode layer during charge.

20. The all solid battery of claim 1, wherein
the all solid battery comprises an anode layer,
the anode layer comprises at least one of amorphous carbon, gold, platinum, palladium, silicon, silver, aluminum, bismuth, tin, or zinc.

21. An all solid battery comprising:
a first electrode comprising
a first current collector,
a first active material layer bonded to the first current collector, and
an other first active material layer bonded to a surface of the first current collector opposite the first active material layer;
a first solid electrolyte layer bonded to a surface of the first active material layer opposite the first current collector;
an other first solid electrolyte layer bonded to a surface of the other first active material layer opposite the first current collector;
a second solid electrolyte layer bonded to a surface of the first solid electrolyte layer opposite the first active material layer;
an other second solid electrolyte layer bonded to a surface of the other first solid electrolyte layer opposite the other first active material layer;
a second electrode comprising
a second current collector, and
a second active material layer bonded to the second current collector and a surface of the second solid electrolyte layer opposite the first solid electrolyte layer;
an other second active material layer bonded to a surface of the other second solid electrolyte layer opposite the other first solid electrolyte layer; and an other second current collector bonded to a surface of the other second active material layer opposite the other second solid electrolyte layer, wherein the first solid electrolyte layer extends farther than the second current collector in a direction away from a first surface of the all solid battery, and wherein the other first solid electrolyte layer extends farther than the second current collector in a direction away from a first surface of the first active material layer.

22. An all solid battery comprising:

a first electrode comprising
- a first current collector, and
- a first active material layer bonded to the first current collector;

a first solid electrolyte layer bonded to a surface of the first active material layer opposite the first current collector;

a second solid electrolyte layer bonded to a surface of the first solid electrolyte layer opposite the first active material layer; and a second electrode comprising
- a second current collector, and
- a second active material layer bonded to the second current collector and a surface of the second solid electrolyte layer opposite the first solid electrolyte layer, wherein the first solid electrolyte layer extends farther than the second current collector in a direction away from a first surface of the all solid battery, and wherein the first solid electrolyte layer is separated from the first current collector or the second solid electrolyte layer is separated from the second current collector.

* * * * *